US012626136B2

(12) United States Patent
Gokmen et al.

(10) Patent No.: US 12,626,136 B2
(45) Date of Patent: May 12, 2026

(54) MATRIX INVERSION USING ANALOG RESISTIVE CROSSBAR ARRAY HARDWARE

(71) Applicant: International Business Machines Corporation, Armonk, NY (US)

(72) Inventors: Tayfun Gokmen, Briarcliff Manor, NY (US); Oguzhan Murat Onen, Boston, MA (US); Chai Wah Wu, Hopewell Junction, NY (US); Mark S. Squillante, Greenwich, CT (US); Malte Johannes Rasch, Chappaqua, NY (US); Tomasz J. Nowicki, Fort Montgomery, NY (US); Wilfried Haensch, Somers, NY (US); Lior Horesh, North Salem, NY (US); Vasileios Kalantzis, White Plains, NY (US); Vanessa Lopez-Marrero, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1491 days.

(21) Appl. No.: 17/134,814

(22) Filed: Dec. 28, 2020

(65) Prior Publication Data

US 2022/0207376 A1      Jun. 30, 2022

(51) Int. Cl.
*G06N 3/084* (2023.01)
*G06F 17/16* (2006.01)
(Continued)

(52) U.S. Cl.
CPC ............ *G06N 3/084* (2013.01); *G06F 17/16* (2013.01); *G06N 3/044* (2023.01); *G06N 3/065* (2023.01)

(58) Field of Classification Search
CPC ........ G06N 3/084; G06N 3/065; G06N 3/044; G06F 17/16
See application file for complete search history.

(56) References Cited

U.S. PATENT DOCUMENTS 8,819,099 B2      8/2014   Sima et al.
9,646,243 B1      5/2017   Gokmen
(Continued)

FOREIGN PATENT DOCUMENTS

WO        2017193922 A1    11/2017

OTHER PUBLICATIONS

Han, R., Huang, P., Zhao, Y. et al. Efficient evaluation model including interconnect resistance effect for large scale RRAM crossbar array matrix computing. Sci. China Inf. Sci. 62, 22401 (2019). https://doi.org/10.1007/s11432-018-9555-8 (Year: 2018).*
(Continued)

*Primary Examiner* — Michael H Hoang
(74) *Attorney, Agent, or Firm* — Kelsey M. Skodje; Ryan, Mason & Lewis, LLP

(57)        ABSTRACT

Matrix inversion systems and methods are implemented using an analog resistive processing unit (RPU) array for hardware accelerated computing. A request is received from an application to compute an inverse matrix of a given matrix, and a matrix inversion process is performed in response to the received request. The matrix inversion process includes storing a first estimated inverse matrix of the given matrix in an array RPU cells, performing a first iterative process on the first estimated inverse matrix stored in the array of RPU cells to converge the first estimated inverse matrix to a second estimated inverse matrix of the given matrix, and reading the second estimated inverse matrix from the array of RPU cells upon completion of the first iterative process. An inverse matrix is returned to the application, wherein the returned inverse matrix is based, at least in part, on the second estimated inverse matrix.

25 Claims, 10 Drawing Sheets

(51) Int. Cl.
  *G06N 3/044* (2023.01)
  *G06N 3/065* (2023.01)

(56) References Cited

U.S. PATENT DOCUMENTS

| | | | |
|---|---|---|---|
| 10,042,819 B2 | 8/2018 | Hu et al. | |
| 10,679,118 B2 * | 6/2020 | Lin | G06F 17/16 |
| 2015/0213884 A1 * | 7/2015 | Taha | G11C 13/0069 |
| | | | 365/148 |
| 2017/0091621 A1 * | 3/2017 | Gokmen | G06N 3/084 |
| 2017/0109626 A1 | 4/2017 | Gokmen et al. | |
| 2018/0089559 A1 | 3/2018 | Copel | |
| 2018/0174024 A1 | 6/2018 | Lin et al. | |
| 2019/0180185 A1 | 6/2019 | Sun et al. | |
| 2019/0325291 A1 | 10/2019 | Gokmen et al. | |

OTHER PUBLICATIONS

Kun Wang, Li Li, Feng Han, Fan Feng, Jun Lin, Design and implementation of high performance matrix inversion based on reconfigurable processor, IEICE Electronics Express, 2016, vol. 13, Issue 15, pp. 20160579, https://doi.org/10.1587/elex.13.20160579 (Year: 2016).*
Wei-Sheng Chin, Yong Zhuang, Yu-Chin Juan, and Chih-Jen Lin. 2015. A Fast Parallel Stochastic Gradient Method for Matrix Fac-torization in Shared Memory Systems. ACM Trans. Intell. Syst. Technol. 6, 1, Article 2 (Apr. 2015), 24 pages. https://doi.org/10.1145/2668133 (Year: 2015).*
Sadeghi, Amir. (2015). A Stable Coupled Newton's Iteration for the Matrix Inverse p th Root. Mathematical Modelling & Computa-tions. 5. 69-79 (Year: 2015).*
Gower, Robert M., and Peter Richtárik. "Randomized quasi-Newton updates are linearly convergent matrix inversion algo-rithms." SIAM Journal on Matrix Analysis and Applications 38.4 (2017): 1380-1409. https://epubs.siam.org/doi/abs/10.1137/16M1062053 (Year: 2017).*
Sun, Zhong, et al. "Solving matrix equations in one step with cross-point resistive arrays." Proceedings of the National Academy of Sciences 116.10 (2019): 4123-4128. https://www.pnas.org/doi/epdf/10.1073/pnas.1815682116 (Year: 2019).*
Wikipedia, "Stochastic Gradient Descent," https://en.wikipedia.org/wiki/Invertible_matrix, Jan. 3, 2020, 12 pages.
Wikipedia, "Invertible Matrix," https://en.wikipedia.org/wiki/Stochastic_gradient_descent, Dec. 11, 2019, 8 pages.
R. M. Gower et al., "Accelerated Stochastic Matrix Inversion: General Theory and Speeding up BFGS Rules for faster Second-Order Optimization", 32nd Conference on Neural Information Pro-cessing Systems, 2018, Montreal, Canada, 11 pages.
P. Mell et al., "The NIST Definition of Cloud Computing," Rec-ommendations of the National Institute of Standards and Technol-ogy, Special Publication 800-145, Sep. 2011, 7 pages.

* cited by examiner

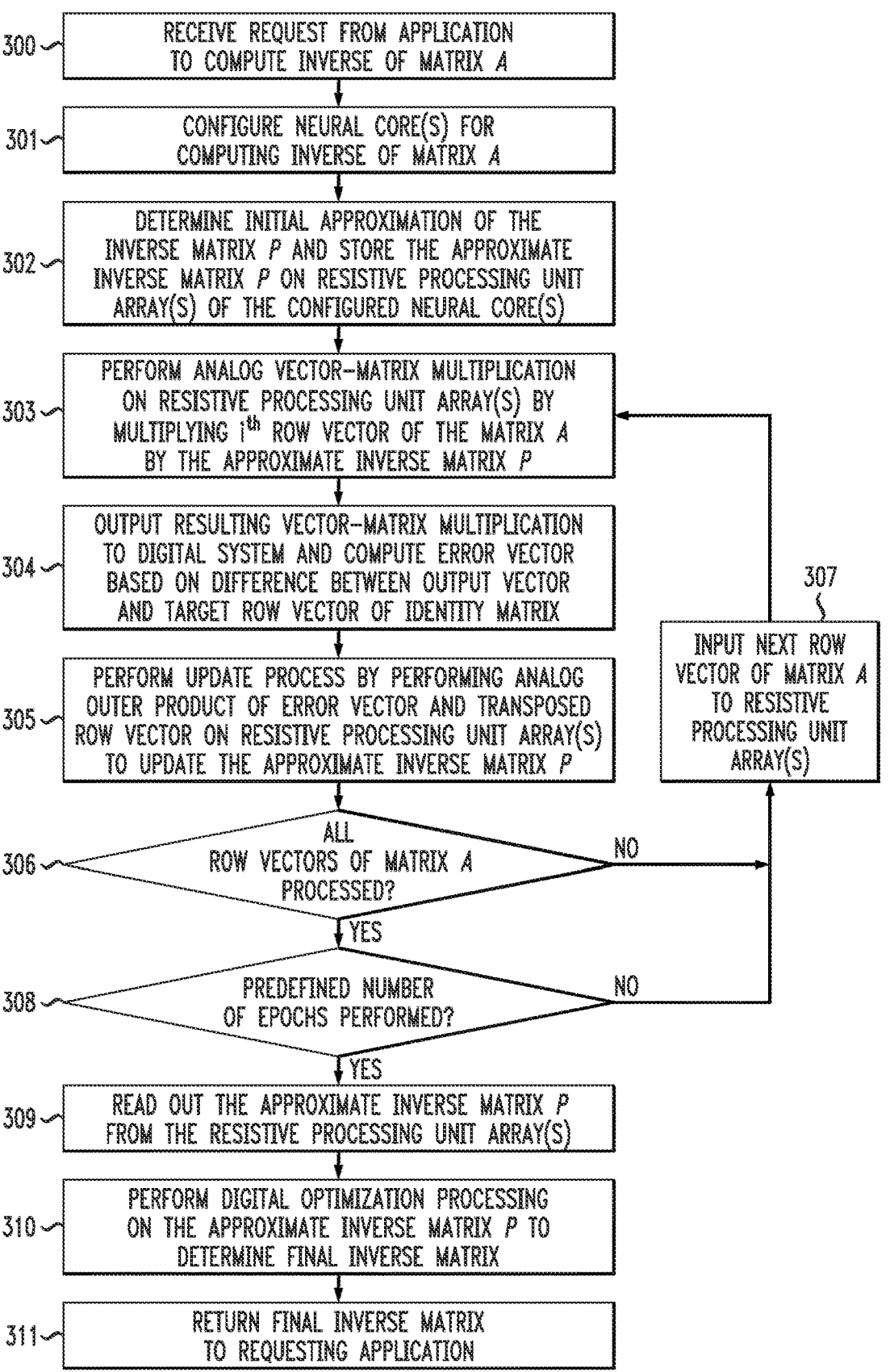

300 — RECEIVE REQUEST FROM APPLICATION TO COMPUTE INVERSE OF MATRIX A

301 — CONFIGURE NEURAL CORE(S) FOR COMPUTING INVERSE OF MATRIX A

302 — DETERMINE INITIAL APPROXIMATION OF THE INVERSE MATRIX P AND STORE THE APPROXIMATE INVERSE MATRIX P ON RESISTIVE PROCESSING UNIT ARRAY(S) OF THE CONFIGURED NEURAL CORE(S)

303 — PERFORM ANALOG VECTOR-MATRIX MULTIPLICATION ON RESISTIVE PROCESSING UNIT ARRAY(S) BY MULTIPLYING $i^{th}$ ROW VECTOR OF THE MATRIX A BY THE APPROXIMATE INVERSE MATRIX P

304 — OUTPUT RESULTING VECTOR-MATRIX MULTIPLICATION TO DIGITAL SYSTEM AND COMPUTE ERROR VECTOR BASED ON DIFFERENCE BETWEEN OUTPUT VECTOR AND TARGET ROW VECTOR OF IDENTITY MATRIX

305 — PERFORM UPDATE PROCESS BY PERFORMING ANALOG OUTER PRODUCT OF ERROR VECTOR AND TRANSPOSED ROW VECTOR ON RESISTIVE PROCESSING UNIT ARRAY(S) TO UPDATE THE APPROXIMATE INVERSE MATRIX P

306 — ALL ROW VECTORS OF MATRIX A PROCESSED? — NO

307 — INPUT NEXT ROW VECTOR OF MATRIX A TO RESISTIVE PROCESSING UNIT ARRAY(S)

YES

308 — PREDEFINED NUMBER OF EPOCHS PERFORMED? — NO

YES

309 — READ OUT THE APPROXIMATE INVERSE MATRIX P FROM THE RESISTIVE PROCESSING UNIT ARRAY(S)

310 — PERFORM DIGITAL OPTIMIZATION PROCESSING ON THE APPROXIMATE INVERSE MATRIX P TO DETERMINE FINAL INVERSE MATRIX

311 — RETURN FINAL INVERSE MATRIX TO REQUESTING APPLICATION

VECTOR MATRIX
MULTIPLICATION $y = x \times P$

OUTER PRODUCT UPDATE $P' = P + \eta x \times \delta$

500

VECTOR MATRIX MULTIPLY $V^T G = I$ $$[V_1, V_2 \ldots V_n] \begin{bmatrix} G_{11} & G_{12} & \cdots & G_{1n} \\ G_{21} & G_{22} & \cdots & G_{2n} \\ \vdots & \vdots & \ddots & \vdots \\ G_{n1} & G_{n2} & \cdots & G_{nn} \end{bmatrix} = [I_1, I_2 \ldots I_n]$$

<u>500</u>

OUTER PRODUCT UPDATE

MATRIX INVERSION USING ANALOG RESISTIVE CROSSBAR ARRAY HARDWARE

BACKGROUND

This disclosure relates generally to analog resistive processing systems for neuromorphic computing, and techniques for performing hardware accelerated numerical computing tasks using an analog resistive processing system. Information processing systems such as Neuromorphic computing systems and artificial neural network (ANN) systems are utilized in various applications such as machine learning and inference processing for cognitive recognition and computing. Such systems are hardware-based systems that generally include a large number of highly interconnected processing elements (referred to as "artificial neurons") that operate in parallel to perform various types of computations. The artificial neurons (e.g., pre-synaptic neurons and post-synaptic neurons) are connected using artificial synaptic devices which provide synaptic weights that represent connection strengths between the artificial neurons. The synaptic weights can be implemented using an array of RPU cells having tunable resistive memory devices, the conductance states of the RPU cells are encoded or otherwise mapped to the synaptic weights.

SUMMARY

Embodiments of the disclosure include computing systems, devices, and methods for performing a matrix inversion process using an analog resistive processing unit array for hardware accelerated computing. For example, an exemplary embodiment includes a method which comprises receiving a request from an application to compute an inverse matrix of a given matrix and performing a matrix inversion process in response to the received request. The matrix inversion process comprises storing a first estimated inverse matrix of the given matrix in an array of resistive processing unit (RPU) cells, performing a first iterative process on the first estimated inverse matrix stored in the array of RPU cells to converge the first estimated inverse matrix to a second estimated inverse matrix of the given matrix, and reading the second estimated inverse matrix from the array of RPU cells upon completion of the first iterative process. An inverse matrix is returned to the application, wherein the returned inverse matrix is based, at least in part, on the second estimated inverse matrix.

Another exemplary embodiment includes a device which comprises an array of resistive processing unit (RPU) cells, first control lines extending in a first direction across the array of RPU cells, and second control lines extending in a second direction across the array of RPU cells, and control circuitry. Each RPU cell is connected at an intersection of one of the first control lines and one of the second control lines. Each RPU cell comprises a resistive device with a tunable conductance, wherein conductance values of a least a portion of the resistive devices of the RPU cells in the array of RPU cells encode matrix values of an estimated inverse matrix that is stored in the array of RPU cells. The estimated inverse matrix stored in the array of RPU cells represents an estimate of an inverse matrix of a given matrix. The control circuitry is operatively coupled to the array of RPU cells to cause performance of a first operation and a second operation on the array of RPU cells. The first operation comprises the control circuitry applying a row vector, which represents a row of the given matrix, to inputs of the first control lines to perform a vector matrix operation which comprises multiplying the input row vector with the estimated inverse matrix stored in the array of RPU cells to generate an output vector on outputs of the second control lines. The second operation comprises the control circuitry applying an error vector to inputs of the second control lines and inputting the row vector to the inputs of the first control lines, to perform an outer product operation of the error vector and the row vector on the array of RPU calls to thereby update at least some matrix values of the estimated inverse matrix that is stored in the array of RPU cells.

Another exemplary embodiment includes a computing system which comprises a digital processing system and a neuromorphic computing system coupled to the digital processing system. The digital processing system comprises one or more processors and memory to store program instructions that are executed by the one or more processors to perform a matrix inversion process to compute an inverse matrix of a given matrix. The neuromorphic computing system comprises at least one neural core. The at least one neural core comprises an array of resistive processing unit (RPU) cells, first control lines extending in a first direction across the array of RPU cells, second control lines extending in a second direction across the array of RPU cells, and peripheral circuitry coupled to the first control lines and to the second control lines. Each RPU cell is connected at an intersection of one of the first control lines and one of the second control lines, and each RPU cell comprises a resistive device with a tunable conductance, wherein conductance values of a least a portion of the resistive devices of the RPU cells in the array of RPU cells encode matrix values of an estimated inverse matrix that is stored in the array of RPU cells. The estimated inverse matrix stored in the array of RPU cells represents an estimate of the inverse matrix of the given matrix. The digital processing system controls the peripheral circuitry to perform first and second operations of the matrix inversion process on the array of RPU cells. The first operation comprises the digital processing system applying a row vector, which represents a row of the given matrix, to inputs of the first control lines to perform a vector matrix operation which comprises multiplying the row vector with the estimated inverse matrix stored in the array of RPU cells to generate an output vector on outputs of the second control lines. The second operation comprises the digital processing system applying an error vector to inputs of the second control lines and inputting the row vector to the inputs of the first control lines, to perform an outer product operation of the error vector and the row vector on the array of RPU calls to thereby update at least some matrix values of the estimated inverse matrix that is stored in the array of RPU cells.

Other embodiments will be described in the following detailed description of exemplary embodiments, which is to be read in conjunction with the accompanying figures.

BRIEF DESCRIPTION OF THE DRAWINGS

FIG. 1 schematically illustrates a computing system for performing matrix inversion process using an analog resistive processing unit array for hardware accelerated computing, according to an exemplary embodiment of the disclosure.

FIG. 3 illustrates a method for performing a matrix inversion process according to an exemplary embodiment of the disclosure.

FIG. 7 schematically illustrates an exemplary architecture of a computing node which can host and execute a matrix inversion process according to an exemplary embodiment of the disclosure.

DETAILED DESCRIPTION

Figure 2:
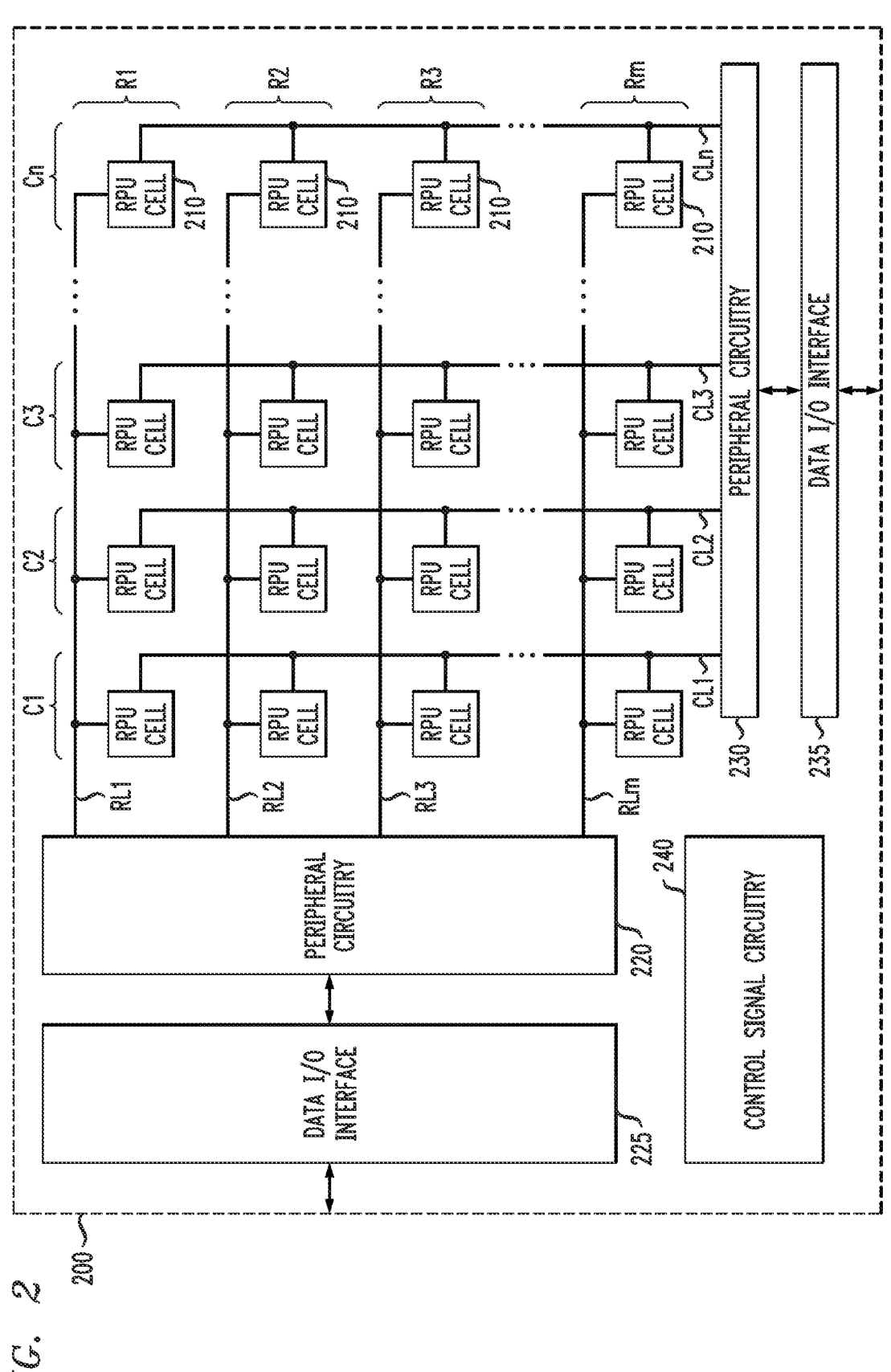
FIG. 2 schematically illustrates a computing system which comprises an array of resistive processing unit cells that can be used to perform a matrix inversion process, according to an exemplary embodiment of the disclosure.

Embodiments of the invention will now be described in further detail with regard to systems and methods for performing matrix inversion using an analog resistive processing unit (RPU) array. It is to be understood that the various features as shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration". Any embodiment or design described herein as "exemplary" is not to be construed as preferred or advantageous over other embodiments or designs.

Figure 1:
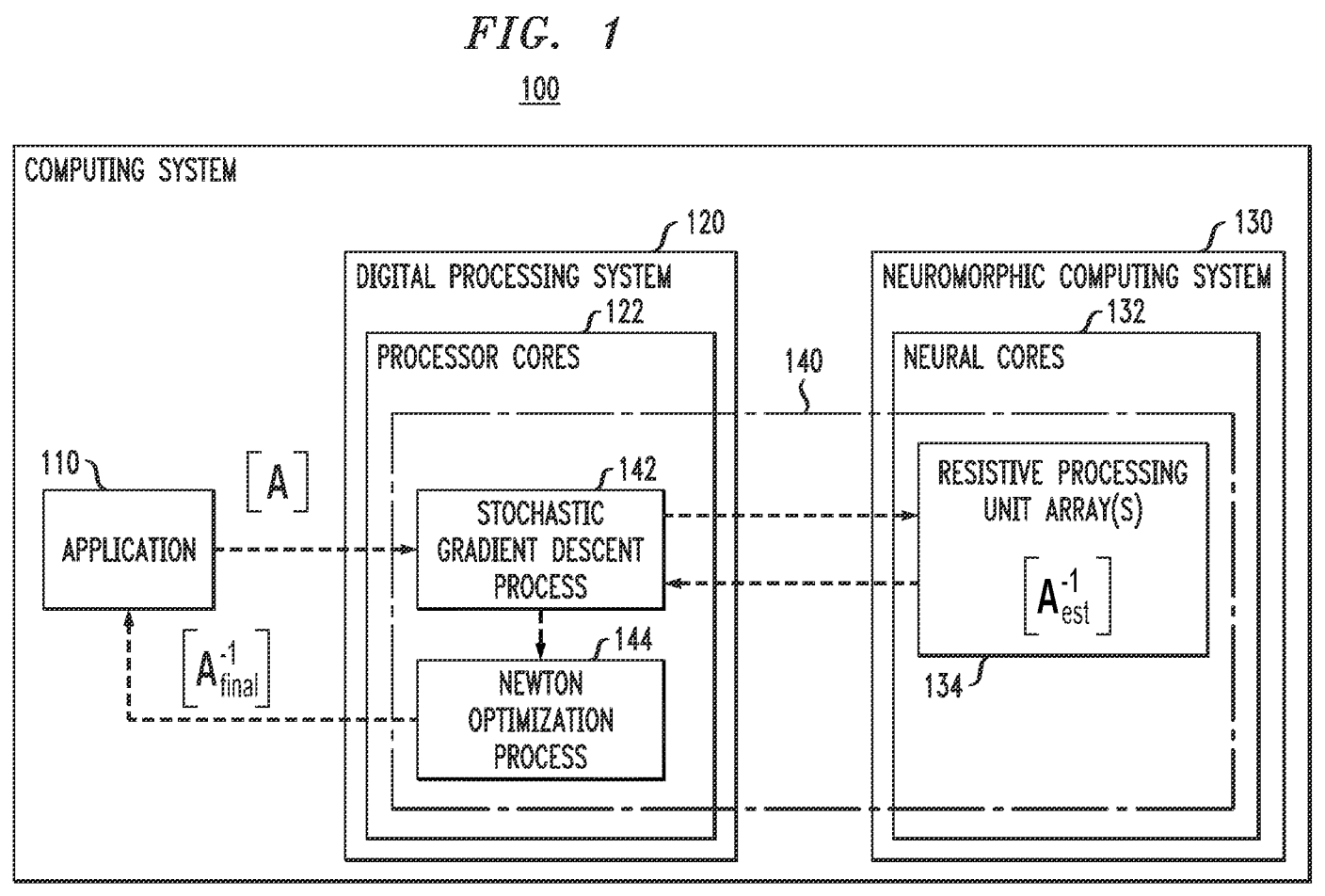

FIG. 1 schematically illustrates a computing system for performing a matrix inversion process using an analog resistive processing unit array for hardware accelerated computing, according to an exemplary embodiment of the disclosure. In particular, FIG. 1 schematically illustrates a computing system 100 comprising an application 110, a digital processing system 120, and a neuromorphic computing system 130. The digital processing system 120 comprises a plurality of processor cores 122. The neuromorphic computing system 130 comprises a plurality of neural cores 132. Each neural core 132 comprises one or more analog resistive processing unit arrays (e.g., analog RPU crossbar array hardware). The neural cores 132 are configured to support hardware acceleration for computing an inverse matrix by performing multiply-accumulate (MAC) operations in the analog domain to support hardware acceleration of numerical operations such as vector-matrix multiplication, matrix-vector multiplication, vector-vector multiplication, and/or matrix multiplication operations, which are performed on the RPU arrays 134.

The digital processing system 120 controls the execution of a matrix inversion process 140 which is performed to compute an inverse matrix for a given matrix A provided by the application 110. The matrix inversion process 140 comprises optimization solver methods, including a stochastic gradient descent (SGD) process 142 and a Newton optimization process 144, which are utilized during the matrix inversion process 140 to compute an inverse matrix. In some embodiments, the SGD process 142 and the Newton optimization process 144 are software modules that are executed by the processor cores 122 of the digital processing system 120 to perform the matrix inversion process 140. The matrix inversion process 140 utilizes the neuromorphic computing system 130 for hardware acceleration to compute an inverse matrix by performing multiply-accumulate (MAC) operations in the analog domain to perform various im-memory computations, such as vector-matrix and vector-vector operations, on an approximate (estimated) inverse matrix $A_{est}^{-1}$ that is stored in one or more of the RPU arrays 134, as schematically illustrated in FIG. 1.

The application 110 may comprise any type of computing application (e.g., scientific computing applications, engineering applications, graphics rendering applications, signal processing applications, MIMO (Multiple-Input, Multiple-Output) system for wireless communications, cryptography, etc.) which utilizes matrices and inverse matrices as computational objects to perform numerical operations, solve linear equations, and perform other computations. As schematically shown in FIG. 1, during the execution of the application 110, the application 110 may invoke a matrix inversion process 140 to compute an inverse matrix $A^{-1}$ of a given matrix A which is input to the matrix inversion process 140. In some embodiments, the matrix A comprises a symmetric positive definite (SN)) matrix. An exemplary embodiment of the matrix inversion process 140 will be discussed in further detail below in conjunction with FIG. 3 in some embodiments, the matrix A comprises a symmetric positive definite (SPD) matrix. An SPD matrix is a square symmetric matrix which has positive eigenvalues. SPD matrices arise in many physical and mathematical contexts for which inverse matrices of the SPD matrices are needed to perform computations.

In some embodiments, the digital processing system 120 controls the execution of matrix inversion process 140. As an initial step, upon receiving the matrix A from the application 110 requesting a computation of an inverse matrix $A^{-1}$, the matrix inversion process 140 will configure one or more cores 132 and associated RPU arrays 134 to provide hardware acceleration support for the matrix inversion process. The matrix inversion process 140 computes an initial approximate inverse matrix $$A_{est}^{-1}$$

(e.g., a random inverse matrix) and stores the initial approximate inverse matrix $$A_{est}^{-1}$$

one or more of the RPU arrays 134 of the one or more neural cores 132 which are configured to support the matrix inversion process 140. The SGD process 142 performs an iterative optimization process which utilizes numerical values in row vectors of the given matrix A as training data to train the approximate inverse matrix $$A_{est}^{-1}$$

and perform an iterative update process in the analog domain (e.g., vector-matrix operations, vector-vector operations, etc. performed on the approximate inverse matrix $$A_{est}^{-1}$$

in the RPU arrays 134) to update the values of the approximate inverse matrix $$A_{est}^{-1}$$

based on errors that are computed against row vectors of an identity matrix I. The iterative SGD process 142 converges the approximate inverse matrix $$A_{est}^{-1}$$

to a close approximation of the actual inverse matrix $$A^{-1}.$$

Upon completion of the SGD process 142, the matrix inversion process 140 reads out the approximate inverse matrix $$A_{est}^{-1}$$

from the RPU arrays 134 of the neuromorphic computing system 130 and performs an optional post-processing optimization in the digital domain using, e.g., the Newton optimization process 144 to further enhance the accuracy of the approximate inverse matrix $$A_{est}^{-1}.$$

Upon completion of the optimization process (e.g., the analog optimization and the optional digital optimization), the matrix inversion process 140 returns the optimized approximate inverse matrix $$A_{est}^{-1}$$

as a final inverse matrix $$A_{final}^{-1}.$$

Details of exemplary embodiment of the optimization methods 142 and 144 will be discussed in further detail below with reference to, e.g., FIG. 3.

FIG. 2 schematically illustrates a computing system which comprises an array of resistive processing unit cells that can be used to perform a matrix inversion process, according to an exemplary embodiment of the disclosure. For example, FIG. 2 schematically illustrates an exemplary embodiment of a neural core 132 and associated RPU array(s) 134 of the neuromorphic computing system 130 of FIG. 1. More specially, FIG. 2 schematically illustrates a computing system 200 (e.g., neuromorphic computing system) which comprises a two-dimensional (2D) crossbar array of RPU cells 210 arranged in a plurality of rows R1, R2, R3, . . . , Rm, and a plurality of columns C1, C2, C3, Cn. The RPU cells 210 in each row R1, R2, R3, . . . , Rm are commonly connected to respective row control lines RL1, RL2, RL3, . . . , RLm (collectively, row control lines RL). The RPU cells 210 in each column C1, C2, C3, Cn are commonly connected to respective column control lines CL1, CL2, CL3, . . . , CLn (collectively, column control lines CL). Each RPU cell 210 is connected at (and between) a cross-point (or intersection) of a respective one of the row and column control lines. In an exemplary embodiment, the number of rows (m) and the number of columns (n) are the same (i.e., n=m). For example, in some embodiments, the computing system 200 comprises a 4,096×4,096 array of RPU cells 210.

The computing system 200 further comprises peripheral circuitry 220 connected to the row control lines RL1, RL2, RL3, . . . , RLm, as well peripheral circuitry 230 connected to the column control lines CL1, CL2, CL3, . . . , CLn. Further, the peripheral circuitry 220 is connected to a data input/output (I/O) interface block 225, and the peripheral circuitry 230 is connected to a data I/O interface block 235. The computing system 200 further comprises control signal circuitry 240 which comprises various types of circuit blocks such as power, clock, bias and timing circuitry to provide power distribution and control signals and clocking signals for operation of the peripheral circuitry 220 and 230 of the computing system 200.

In some embodiments, each RPU cell 210 in the computing system 200 comprises a resistive element with a conductance value that is tunable. During operation, some or all of the RPU cells 210 in the computing system 200 comprise respective conductance values that are mapped to respective numerical matrix values of an approximate inverse matrix $$A_{est}^{-1}$$

that is stored in the array of RPU cells 210. In some embodiments, the resistive elements of the RPU cells 210 are implemented using resistive devices such as resistive switching devices (interfacial or filamentary switching devices), ReRAM, memristor devices, phase change memory (PCM) device, etc.) and other types of devices which have a tunable conductance (or tunable resistance level) which can be programmatically adjusted within a range of a plurality of different conductance levels to tune the weight of the RPU cell 210. In some embodiments, the variable conductance elements of the RPU cells 210 can be implemented using ferroelectric devices such as ferroelectric field-effect transistor devices. Furthermore, in some embodiments, the RPU cells 210 can be implemented using an analog CMOS-based framework in which each RPU cell 210 comprises a capacitor and a read transistor. With the framework, the capacitor serves as a memory element of the RPU cell 210 and stores a weight value in the form a capacitor voltage, wherein the capacitor voltage is applied to a gate terminal of the read transistor to modulate a channel resistance of the read transistor based on the level of the capacitor voltage, and wherein the channel resistance of the read transistor represents the conductance of the RPU cell and is correlated to a level of a read current that is generated based on the channel resistance.

While the row control lines RL and column control lines CL are each shown in FIG. 2 as a single line for ease of illustration, it is to be understood that each row and column control line can include two or more control lines connected to the RPU cells 210 in the respective rows and columns, depending on the implementation and the specific architecture of the RPU cells 210. For example, in some embodiments, each row control line RL can include a complementary pair of word lines for a given RPU cell 210. Moreover, each column control line CL may comprise multiple control lines including, e.g., one or more source lines (SL) and one or more bit lines (BL).

The peripheral circuitry 220 and 230 comprises various circuit blocks which are connected to the respective rows and columns in the 2D array of RPU cells 210, and which are configured to perform vector-matrix multiply functions, matrix-vector multiply functions, and outer product update operations to implement operations needed to perform a matrix inversion process, according to an exemplary embodiment of the disclosure. For example, in some embodiments, to support RPU cell read/sensing operations (e.g., read a weight value of a given RPU cell 210), the peripheral circuitry 220 and 230 comprises pulse-width modulation (PWM) circuitry and read pulse driver circuitry to generate and apply PWM read pulses to the RPU cells 210, in response to input vector values (read input values) received during different operations.

More specifically, in some embodiments, the peripheral circuitry 220 and 230 comprises digital-to-analog (D/A) converter circuitry that is configured to receive digital input vectors (to be applied to rows or columns) and convert the digital input vector into analog input vector values that are represented by input voltage voltages of varying pulse width. In some embodiments, a time-encoding scheme is used when input vectors are represented by fixed amplitude Vin=1 V pulses with a tunable duration (e.g., pulse duration is a multiple of 1 ns and is proportional to the value of the input vector). The input voltages applied to rows (or columns) generate output vector values which are represented by output currents, wherein the weights of the RPU cells 210 are read out by measuring the output currents.

The peripheral circuitry 220 and 230 further comprises current integrator circuitry and analog-to-digital (A/D) converter circuitry to integrate read currents ($I_{READ}$) which are output and accumulated from the connected RPU cells 210 and convert the integrated currents into digital values (read output values) for subsequent computation. In particular, the currents generated by the RPU cells 210 are summed on the columns (or rows) and this total current is integrated over a measurement time, tmeas, by current readout circuitry of the peripheral circuitry 220 and 230. The current readout circuitry comprises current integrators and analog-to-digital (A/D) converters. In some embodiments, each current integrator comprises an operational amplifier that integrates the current output from a given column (or row) (or differential currents from pairs of RPU cells implementing negative and positive weights) on a capacitor, and an analog-to-digital (A/D) converter converts the integrated current (e.g., an analog value) to a digital value.

The data I/O interfaces 225 and 235 are configured to interface with a digital processing core, wherein the digital processing core is configured to process input/outputs to the computing system 200 (neural core) and route data between different RPU arrays. The data I/O interfaces 225 and 235 are configured to (i) receive external control signals and data from a digital processing core and provide the received control signals and data to the peripheral circuitry 220 and 230, and (ii) receive digital read output values from peripheral circuitry 220 and 230, and send the digital read output values to a digital processing core for processing.

FIG. 3 illustrates a method for performing a matrix inversion process according to an exemplary embodiment of the disclosure. In some embodiments, FIG. 3 illustrates a process flow which is implemented by the computing system 100 of FIG. 1. During run-time execution of a given application, the application may need to perform a computation that requires an inverse matrix $A^{-1}$ of a given matrix A. The computing system will receive a request from the given application to determine the inverse matrix $A^{-1}$ of the given matrix A (block 300). The request will include the values of matrix A. In some embodiments, the matrix A comprises a square matrix, e.g., n×n matrix, with n rows and n columns, where n can be relatively large (e.g., 100 or greater). In some embodiments, the matrix A comprises an SPD matrix. The computing system invokes a matrix inversion process (e.g., process 140, FIG. 1) to compute the inverse matrix $A^{-1}$ of the input matrix A.

In some embodiments, the invocation of the matrix inversion process comprises an initial process of configuring the neuromorphic computing system 130 to provide accelerator hardware support for performing the matrix inversion process (block 301). For example, in some embodiments, the digital signal processing system 120 communicates with a programming interface of the neuromorphic computing system 130 to configure one or more neurons and a routing system of the neuromorphic computing system 130 to allocate and configure one or more neural cores to implement one or more interconnected RPU arrays for storing matrix values of an approximate (estimated) inverse matrix $$A_{est}^{-1}$$

and performing in-memory computations on the approximate inverse matrix $$A_{est}^{-1}$$

(alternative referred to as approximate inverse matrix P).

In some embodiments, the number of RPU arrays that are allocated and interconnected will vary depending on the size of the matrix A and the size of the RPU arrays. For example, if the RPU arrays have a size of 4096×4096, then one RPU array can be configured to store the values of the approximate inverse matrix $$A_{est}^{-1}$$

and perform a matrix inversion process for an n×n matrix A, where n is 4096 or less. In some embodiments, when the approximate inverse matrix $$A_{est}^{-1}$$

matrix is smaller than the physical RPU on which the approximate inverse matrix $$A_{est}^{-1}$$

matrix is stored, any unused RPU cells can be set to zero and/or unused inputs to the RPU array can be padded by "zero" voltages. In some embodiments, when the size of the n×n matrix A is greater than the size of a single RPU array, then multiple RPU arrays can be operatively interconnected to form an RPU array which is large enough to store the values of the approximate inverse matrix $$A_{est}^{-1}$$

of the n×n matrix A.

Next, the matrix inversion process determines an initial approximation of the inverse matrix $$A_{est}^{-1}$$

(e.g., a first estimated inverse matrix) and stores the initial approximate of the inverse matrix $$A_{est}^{-1}$$

on the allocated RPU array(s) of the configured neural core(s) (block 302). In some embodiments, the initial approximate inverse matrix $$A_{est}^{-1}$$

comprises a random matrix that is determined using a predetermined function. For example, in some embodiments, the initial approximated inverse matrix $$A_{est}^{-1}$$

comprises a random matrix which comprises a set of uniformly distributed random numbers with a mean of zero and a variance of 1. In this embodiment, the initial values of the approximate inverse matrix $$A_{est}^{-1}$$

range from 0 to 1. Other techniques can be implemented for computing a random matrix based on, e.g., the given application, the size of the matrix A, etc.

A next phase of the exemplary matrix inversion process comprises performing an iteration of an SGD process (e.g., blocks 304, 305, 306, 307) to train the approximate inverse matrix $$\left[ A_{est}^{-1} \right]$$

using the rows of the matrix A as training data, and performing an iterative update process to update the values of the approximate inverse matrix $$A_{est}^{-1}$$

based on errors that are computed against row vectors of an identity matrix I. For ease of illustration and discussion, the process flow of blocks 304, 305, 306, 307 will be described in the context of an exemplary n×n matrix A, wherein n=3, such that:

$$A = \begin{bmatrix} a_{11} & a_{12} & a_{13} \\ a_{21} & a_{22} & a_{23} \\ a_{31} & a_{32} & a_{33} \end{bmatrix},$$

and wherein an exemplary n×n Identity matrix (denoted by I), where:

$$I = \begin{bmatrix} 1 & 0 & 0 \\ 0 & 1 & 0 \\ 0 & 0 & 1 \end{bmatrix},$$

The Identity matrix I comprises a main diagonal with all values on the main diagonal equal to 1, and all other values equal to zero. The Identity matrix I is a square matrix that corresponds to a scalar value of 1 such that for the given n×n matrix A (which is invertible), the inverse of matrix A is an n×n matrix $A^{-1}$ which satisfies the condition: $A \times A^{-1} = A^{-1} \times A = I$. For purposes of illustration and discussion, assume that the approximate inverse matrix $$A_{est}^{-1}$$

is denoted P where:

$$P = \begin{bmatrix} p_{11} & p_{12} & p_{13} \\ p_{21} & p_{22} & p_{23} \\ p_{31} & p_{32} & p_{33} \end{bmatrix}.$$

Referring to FIG. 3, as an initial step of the exemplary SGD process, an analog vector-matrix multiplication is performed on the RPU array(s) by multiplying the $i^{th}$ row vector of matrix A by the approximate inverse matrix P (block 303). For an n×n matrix A where the matrix A has n rows, the term $A_i$ denotes the $i^{th}$ row of matrix A, where i=[1, 2, . . . , n]. The vector-matrix multiplication $A_i \times P$ yields a 1×n vector $Y_i$=[y1, y2, . . . , yn]. In the above example where n=3, and the matrix A has three rows where i=[1, 2, 3] where the first row $A_1$=[$a_{11}$, $a_{12}$, $a_{13}$], the vector-matrix multiplication $A_1 \times P$:

$$[a_{11} \quad a_{12} \quad a_{13}] \begin{bmatrix} p_{11} & p_{12} & p_{13} \\ p_{21} & p_{22} & p_{23} \\ p_{31} & p_{32} & p_{33} \end{bmatrix}$$

yields a 1×3 vector $Y_1$=[y1, y2, y3], wherein:

$$y1 = (a_{11}p_{11}) + (a_{12}p_{21}) + (a_{13}p_{31})$$

$$y2 = (a_{11}p_{12}) + (a_{12}p_{22}) + (a_{13}p_{32})$$

$$y3 = (a_{11}p_{13}) + (a_{12}p_{23}) + (a_{13}p_{33})$$

Ideally, if the approximate inverse matrix P was the actual inversion matrix $A^{-1}$ of the matrix A, the $i^{th}$ entry (e.g., y1) of the vector $Y_1$ would be 1 and all other entries would be 0 (i.e., $Y_1$=[1, 0, . . . , 0]). However, since there will likely be some difference between the actual values of the vector $Y_1$=[y1, y2, . . . , yn] and the target values [1, 0, . . . , 0], an iteration of an update process is performed to update numerical values of the approximate inverse matrix P.

In particular, the resulting vector $Y_i$=[y1, y2, . . . , yn] is output to the SOD process 142 executing in the digital processing 120 wherein an error vector δ is computed in the digital domain based on a difference between the output vector $Y_i$=[y1, y2, . . . , yn] and a target row vector $I_i$ of I (block 304). More specifically, in some embodiments, an error vector δi=[$\delta_1$, $\delta_2$, . . . , $\delta_n$] is computed as $(A_i \times P) - I_i$, wherein $I_i$ denotes the $i^{th}$ row of I, where i=[1, 2, . . . , n]. In the above example where n=3 and $A_1 \times P$ yields the vector $Y_1$=[y1, y2, y3], the error vector δ is computed as:

$$\delta 1 - = [(A_1 \ P) - I_1] = [Y_1 - I_1] = [(y1 - 1), (y2 - 0), (y3 - 0)].$$

Next, the approximate inverse matrix P is updated by performing an analog outer product of the error vector δi and a transpose $$A_i^T$$

of the current row vector $A_i$ (block 305). More specifically, in some embodiments, an update process is performed as follows:

$$P' := P + \eta A_i^T \times 6i,$$

where P' denotes an update to the current approximate inverse matrix P, where δi=[$\delta_1$, $\delta_2$, . . . , $\delta_n$] denotes the error vector computed as $(A_i \times P) - I_i$, and where η denotes a learning rate (e.g., ranging from 0.01 to 0.001). The learning rate η is scale factor that is applied to the values of the transposed row vector $$A_i^T.$$

In this example, the transposed row vector $$A_i^T$$

represents the $i^{th}$ column of a transpose $A^T$ of the matrix A.

The process flow of blocks 303, 304 and 305 is performed for all rows of the matrix A in sequence, wherein each iteration of blocks 303, 304, and 305 over all the rows of the matrix A comprises one "epoch." In this regard, each "epoch" results in n updates to the approximate inverse matrix P as follows:

$$P' := P + \eta A_1^T \times 61, P' := P + \eta A_2^T \times 62P' := P + \eta A_n^T \times 6n.$$

After each iteration of blocks 303, 304, and 305 (i.e., each iteration of the SGD process), a determination is made as to whether all the row vectors of the matrix A have been processed for the given epoch (block 306). If all rows have not yet been processed for the given epoch (negative determination in block 306), the next row vector $A_i$ of the matrix A will be input to the RPU array(s) (block 307) to perform the next vector-matrix multiplication on the RPU array(s) (return to block 303).

On the other hand, if it is determined that all rows have been processed for the given epoch (affirmative determination in block 306), a determination is made as to whether a predefined number of epochs have been performed (block 308). In some embodiments, the SGD process is implemented to train the approximate inverse matrix P for a predetermined number of epochs in which it is assumed that the approximate inverse matrix P converges to a sufficient approximation of the actual inverse matrix $A^{-1}$ with an analog accuracy (e.g., error sum of squares (SSE)) that is acceptable for the given application, or which otherwise provides a sufficiently accurate approximation of the actual inverse matrix $A^{-1}$ to be utilized as a seed in a digital optimization process that may be applied in the digital domain to obtain an approximation of the actual inverse matrix $A^{-1}$ with even greater accuracy. In an exemplary embodiment, a predefined number of epochs can be, e.g., 100 epochs. However, the predefined number of epochs will vary depending on the application and the degree of accuracy needed from the analog SGD training process. In some embodiments, the predefined number of epochs that is utilized for a given application can be determined based historical empirical information from which one may determine a number of epochs that may result in an approximate inverse matrix $A^{-1}$ with a target accuracy.

If it is determined that the predefined number of epochs have not been performed (negative determination in block 308), a next epoch will be performed starting with inputting the first row vector $A_1$ of the matrix A to the RPU array(s) and performing the analog vector-matrix multiplication operation (return to block 303). On the other hand, if it is determined that the predefined number of epochs have been performed (affirmative determination in block 308), the approximate inverse matrix P (e.g., second estimated inverse matrix) will be read out from the RPU array(s) (block 309). In some embodiments, the approximate inverse matrix P which is read out from the RPU array(s) (e.g., the second estimated inverse matrix) will be returned to the requesting application as the final inverse matrix $$A^{-1}_{final}.$$

In this instance, the approximate inverse matrix P that is computed in the analog domain using the SGD process may be deemed sufficiently accurate for the given application.

In some embodiments, the approximate inverse matrix P (e.g., second estimated inverse matrix) which is read out from the RPU array(s) will be further processed in the digital domain by performing an iterative digital optimization process to converge the approximate inverse matrix P to a final inverse matrix $$A^{-1}_{final}$$

(e.g., third estimated inverse matrix) which is more accurate than the approximate inverse matrix P (e.g., second estimated inverse matrix) which is read out from the RPU array(s) (block 310). For example, in some embodiments, digital post-processing is performed using Newton's optimization process.

More specifically, in some embodiments, the digital optimization is performed using an iterative process as follows: $P_{i+1}:=2P_i-P_iAP_i$, where $i=(0, 1, 2, \ldots)$ denotes the $i^{th}$ iteration, wherein $i=0$ represents a first iteration $P_1$ performed on the approximate inverse matrix P (e.g., $P_0$) initially read out from the read out from the RPU array(s).

In some embodiments, after each iterative computation, an error checking process is performed which comprises (i) computing an error based on $(P_{i+1} \times A)-I$, and (ii) comparing the computed error to an error threshold value. Each iteration of the digital optimization should result in the matrix multiplication $(P_{i+1} \times A)$ becoming increasingly closer to the identity matrix I. If the computed error (following a given iteration) is less than or equal to the error threshold value, the digital optimization process can terminate, and the last computed approximate inverse matrix $P_{i+1}$ is returned as the final inverse matrix $$A^{-1}_{final}$$

to the requesting application (block 311). In some embodiments, the error threshold value is based on, e.g., a target bit precision (e.g., 64-bit precision, 128-bit precision, etc.) which is desired for the given application.

Figures 4A, 4B:
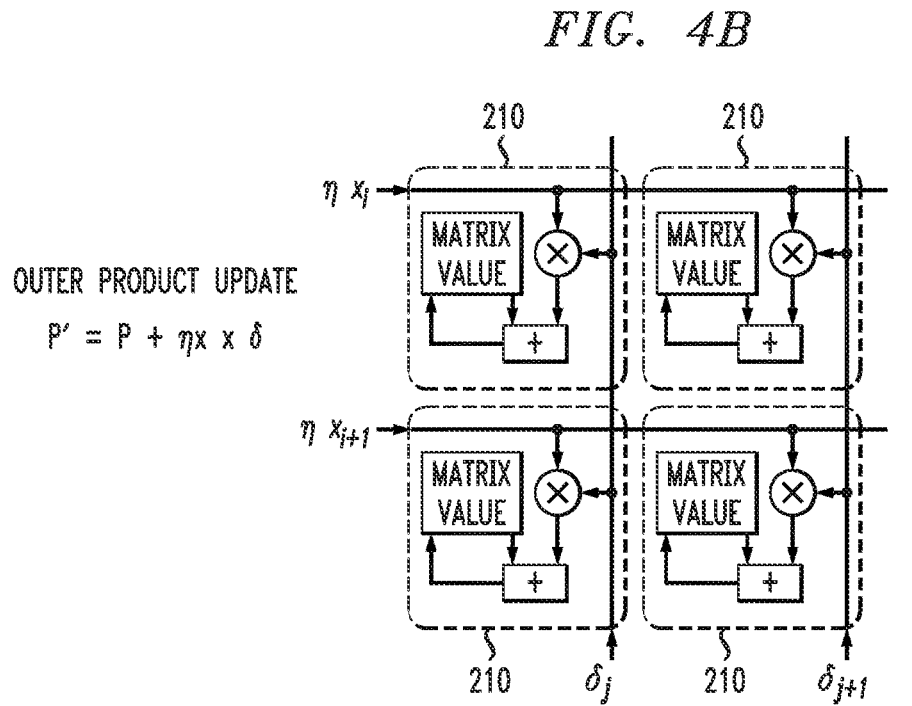
FIG. 4A schematically illustrates a method for performing an analog vector-matrix multiplication operation of a matrix inversion process that is performed on an array of resistive processing unit cells of a computing system, according to an exemplary embodiment of the disclosure.
FIG. 4B schematically illustrates a method for performing an analog vector-vector multiplication operation of a matrix inversion process that is performed on an array of resistive processing unit cells of a computing system to update an approximate inverse matrix, according to an exemplary embodiment of the disclosure.

FIGS. 4A, 4B, 5A and 5B schematically illustrate the vector-matrix multiplication and outer product (update) computations that are performed on an array of RPU cells to implement the process flow of blocks 303, 304, and 305 (FIG. 3). In particular, FIG. 4A schematically illustrates a vector-matrix multiplication that is performed on an array of RPU cells 210 of the computing system 200 of FIG. 2. The conductance values of the RPU cells 210 are mapped to respective matrix elements 212 of an approximate inverse matrix P that is stored in the array of RPU cells 210. Each RPU cell 210 performs a local multiplication operation 214 and local summation operation 216 to perform a vector matrix multiplication operation (e.g., block 303, FIG. 3). In particular, FIG. 4A illustrates a vector-matrix multiplication $y=x \times P$, where x denotes a $1 \times n$ row vector of the matrix A, where P denotes the approximate inverse of the matrix A (wherein the matrix elements 212 of the RPU cells 210 are encoded by the respective conductance values of the RPU cells 210), and where y denotes a $1 \times n$ vector that is generated as a result of the vector-matrix multiplication $y=x \times P$. As schematically illustrated in FIG. 4A, the input row vector x is applied to the row lines, and the output vector y is output on the column lines. For ease of illustration, FIG. 4A shows two elements $(x_i, x_{i+1})$ of the input row vector x and the corresponding two elements $(y_i, y_{i+1})$ of the output vector y which are generated as a result of the vector-matrix multiplication.

Further, FIG. 4B illustrates a vector-vector multiplication (outer product) that is performed on the array of RPU cells 210 of the computing system 200 of FIG. 2 to the matrix values 210 of the approximate inverse matrix P that is stored in the array of RPU cells 210. More specifically, FIG. 4B schematically illustrates an update process $P':=P+\eta x \times \delta$, where x denotes the $1 \times n$ row vector of the matrix A applied to the rows for the vector-matrix application, but scaled with a parameter $\eta$ (a global learning rate), and where $\delta$ is a $1 \times n$ error vector that is applied to the column lines. The vector-vector outer product comprises multiplication operation and an incremental weight update to be performed locally at each cross-point (RPU cell 210) in the computing system 200 of FIG. 2. The update process is computed as: $p_{ij} \leftarrow p_{ij} + \eta x_i \times \delta_j$, where $p_{ij}$ represents the matrix value of P stored in the RPU cell 210 at the cross point of the $i^{th}$ row and the $j^{th}$ column (for simplicity layer index is omitted). For the updated process, voltage pulses representing vectors x and $\delta$ are simultaneously applied to the rows and the columns, wherein each RPU cell 210 performs a local multiplication and summation operation by processing the voltage pulses coming from the column and the row and hence achieving an incremental weight update.

In some embodiments, to determine the product of the xi and $\delta$j vectors for the incremental update process, stochastic translator circuitry in the peripheral circuitry 220 and 230 is utilized to generate stochastic bit streams that represent the input vectors xi and $\delta$j. The stochastic bits streams for the vectors xi and $\delta$j are applied to the rows and columns in the 2D crossbar array of RPU cells 210, wherein the conductance value of a given RPU cell 210 (and hence, the corresponding matrix value) will change depending on the coincidence of the xi and $\delta$j stochastic pulse streams input to the given RPU cell 210. The vector cross product operations for the update operation are implemented based on the known concept that coincidence detection (using an AND logic gate operation) of stochastic streams representing real numbers is equivalent to a multiplication operation.

Figure 5A:
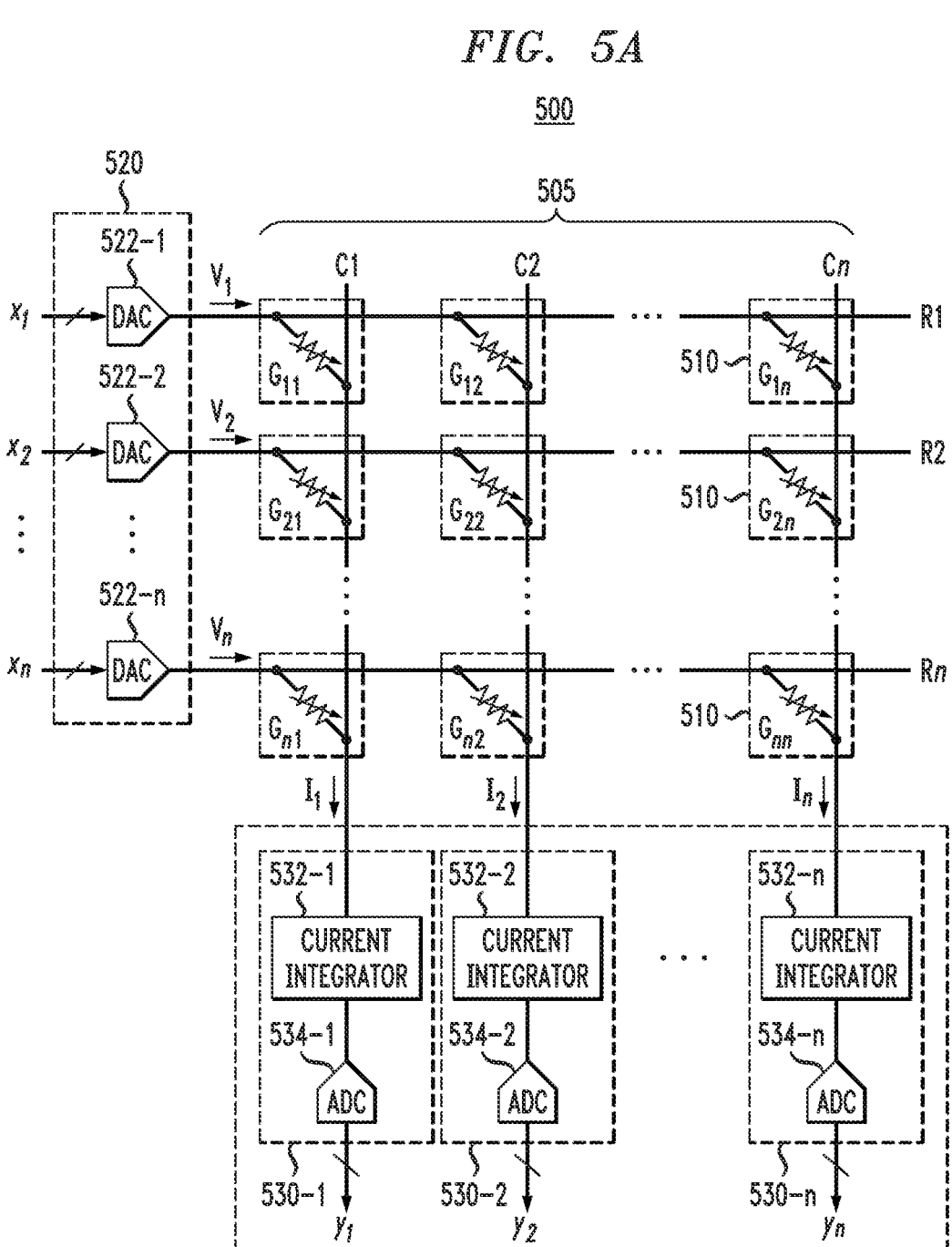
FIG. 5A schematically illustrates a method for configuring a computing system comprising an array of resistive processing unit cells to perform a vector-matrix operation for a matrix inversion process, according to an exemplary embodiment of the disclosure.

FIG. 5A schematically illustrates a method for configuring a computing system comprising an array of resistive processing unit cells to perform a vector-matrix operation for a matrix inversion process, according to an exemplary embodiment of the disclosure. In particular, FIG. 5A schematically illustrates a computing system 500 which comprises a crossbar array of RPU cells 505, wherein each RPU cell 510 in the array 505 comprises an analog non-volatile resistive element (represented as a variable resistor having a tunable conductance G) at the intersection of each row (R1, R2, . . . , Rn) and column (C1, C2, . . . , Cn). As depicted in FIG. 5A, the array of RPU cells 505 provides a matrix of conductance values Gij which are mapped to matrix values of an approximate inverse matrix P, which are encoded by the conductance values Gij (where i represents a row index and j denotes a column index) of the respective RPU cells 510.

To perform a vector-matrix multiplication process for the matrix inversion process (e.g., block 303 (FIG. 3), FIG. 4A), multiplexers in the peripheral circuitry of the computing system 500 are activated to selectively connect row line driver circuitry 520 to the row lines R1, R2, . . . , Rm. The row line driver circuitry 520 comprises plurality of digital-to-analog (DAC) circuit blocks 522-1, 522-2, . . . , 522-n (collectively DAC circuit blocks 522) which are connected to respective row lines R1, R2, . . . , Rn. In addition, multiplexers in the peripheral circuitry of the computing system 500 are activated to selectively connect readout circuitry 530 to the column lines C1, C2, . . . , Cn. The readout circuitry 530 comprises a plurality of readout circuit blocks 530-1, 530-2, . . . , 530-n, which are connected to respective column lines C1, C2, . . . , Cn. The readout circuit blocks 530-1, 530-2, . . . , 530-n comprise respective current integrator circuitry 532-1, 532-2, . . . , 532-n, and respective analog-to-digital (ADC) circuitry 534-1, 534-2, . . . , 534-n. The current integrator circuitry comprises current integrator circuit blocks, wherein each current integrator comprises an operational transconductance amplifier (OTA) with negative capacitive feedback to convert an input current (aggregate column current) to an output voltage on output node of the current integrator circuit, wherein at the end of an integration period, each ADC circuit latches in the output voltage generated at an output node of a respective current integrator circuit quantizes the output voltage to generate a digital output signal.

In the exemplary configuration of FIG. 5A, a vector-matrix multiplication process for a matrix inversion process is performed by inputting a digital input vector x=[x₁, x₂, . . . , xₙ] to the computing system 500, wherein x=[x₁, x₂, . . . , xₙ] represents a 1×n row vector of a given row of the matrix A). The digital signals x₁, x₂, . . . , xₙ are input to respective DAC circuit blocks 522-1, 522-2, . . . , 522-m which generate analog voltages V(t) (voltage as a function of time) signal on the row lines R1, R2, . . . , Rn which are proportional to the values of x=[x₁, x₂, . . . , xₙ]. In some embodiments, the DAC circuit blocks 522-1, 522-2, . . . , 522-n each comprise a pulse-width modulation circuitry and driver circuitry which is configured to generate pulse-width modulated (PWM) read pulses V₁, V₂, . . . , Vₙ that are applied to the respective row lines R1, R2, . . . , Rn.

More specifically, in some embodiments, the DAC circuit blocks 522-1, 522-2, . . . , 522-n are configured to perform a digital-to-analog conversion process using a time-encoding scheme where the input vectors are represented by fixed amplitude pulses (e.g., V=1V) with a tunable duration, wherein the pulse duration is a multiple of a prespecified time period (e.g., 1 nanosecond) and is proportional to the value of the input vector. For example, a given digital input value of 0.5 can be represented by a voltage pulse of 4 ns, while a digital input value of 1 can be represented by a voltage pulse of 80 ns (e.g., a digital input value of 1 can be encoded to an analog voltage pulse with a pulse duration that is equal to the integration time $T_{meas}$). As shown in FIG. 5A, the resulting analog input voltages V₁, V₂, . . . , Vₙ (e.g., read pulses), are applied to the row lines R1, R2, . . . , Rn.

To perform a vector-matrix multiplication, the analog input voltages V₁, V₂, . . . , Vₙ (e.g., read pulses), are applied to the row lines R1, R2, . . . , Rn, wherein each RPU cell 510 generates a corresponding read current $I_{READ}=V_i\times G_{ij}$ (based on Ohm's law), wherein $V_i$ denotes the analog input voltage applied to the given RPU cell 510 on the given row i and wherein Gij denotes the conductance value of the given RPU cell 510 (at the given row i and column j). As shown in FIG. 5A, the read currents that are generated by the RPU cells 510 on each column j are summed together (based on Kirchhoff s current law) to generate respective currents I₁, I₂, . . . , Iₙ at the output of the respective columns C1, C2, . . . , Cn. In this manner, the resulting column currents I₁, I₂, . . . , Iₙ represent the result of a vector-matrix multiplication operation that is performed (to multiply the given row vector of the matrix A with the approximate inverse matrix P), wherein the input analog voltage vector [V₁, V₂, . . . , Vₙ] is multiplied by the conductance matrix G (of conductance values Gij) to generate and output an analog current vector [I₁, I₂, . . . , Iₙ], as illustrated in FIG. 5A. In particular, a given column current $I_j$ is computed as $$I_j = \sum_{i=1}^{n} V_i G_{ij}.$$

For example, the column current I₁ for the first column C1 is determined as $I_1=(V_1 G_{11}+V_2 G_{21}+, . . . , +V_n G_{n1})$.

The resulting aggregate read currents I₁, I₂, . . . , Iₙ at the output of the respective columns C1, C2, . . . , Cn are input to respective readout circuit blocks 530-1, 530-2, 530-n of the readout circuitry 530. The aggregate read currents I₁, I₂, . . . , Iₙ are integrated by the respective current integrator circuits 532-1, 532-2, . . . , 532-n to generate respective output voltages, which are quantized by the respective ADC circuits 534-1, 534-2, . . . , 534-n to generate respective digital output signals y₁, y₂, . . . , yₙ of an output vector y. The digital output signals y₁, y₂, . . . , yₙ are transmitted to the digital processing system and processed to determine the errors. As noted above, in some embodiments, the error is determined as a difference between the output values y₁, y₂, . . . , yₙ and target values for a corresponding row of the identity matrix I. The digital processing system generates a digital error vector δ which is then applied to the computing system 500 to perform an update process, as schematically illustrated in FIG. 5B.

Figure 5B:
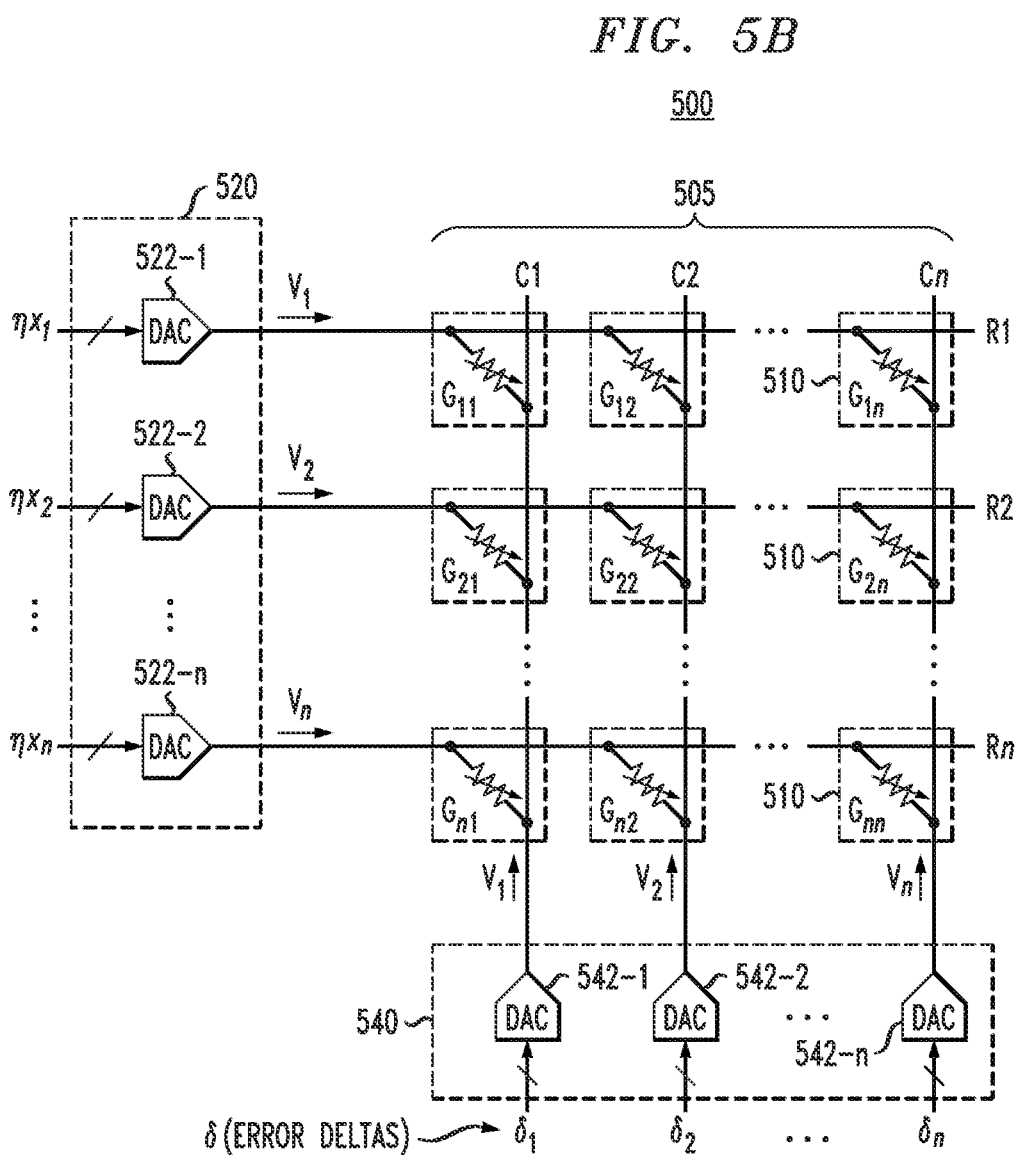
FIG. 5B schematically illustrates a method for configuring a computing system comprising an array of resistive processing unit cells to perform an analog vector-vector multiplication operation of a matrix inversion process to update matrix values of an approximate inverse matrix stored in the array of resistive processing unit cells, according to an exemplary embodiment of the disclosure.

FIG. 5B schematically illustrates a method for configuring a computing system comprising an array of resistive processing unit cells to perform an inverse matrix update process for a matrix inversion process, according to an exemplary embodiment of the disclosure. More specifically, FIG. 5B schematically illustrates a method for configuring the computing system 500 to perform a vector-vector outer product computation (e.g., block 305 (FIG. 3), FIG. 4B) to incrementally update matrix values of the approximate inverse matrix P stored in the RPU array 505. FIG. 5B schematically illustrates a configuration of the computing system 500 in which multiplexers in the peripheral circuitry of the computing system 500 are activated to selectively connect column line driver circuitry 540 to the column lines
C1, C2, . . . , Cn. The column line driver circuitry 540
comprises a plurality of DAC circuit blocks 542-1,
542-2, . . . , 542-$n$ (collectively DAC circuit blocks 542)
which are connected to respective column lines C1,
C2, . . . , Cn. As further shown in FIG. 5B, for the update
operation, the DAC circuit blocks 522-1, 522-2, . . . , 522-$n$
are connected to the respective row lines R1, R2, . . . , Rn.
The DAC circuit blocks 542 perform the same function as
the DAC circuit blocks 522 as described above.

As shown in FIG. 5B, for the update operation (vector-
vector outer product operation) performed on the array of
RPU cells 305 of the computing system 500, the vector of
error signals $\delta=[\delta_1, \delta_2, \ldots, \delta_n]$ provided by the digital
processing system is input the DAC circuitry 542, wherein
the digital error signals $\delta_1, \delta_2, \ldots, \delta_n$ are input to the
respective DAC circuit blocks 542-1, 542-2, . . . , 542-$n$
which are connected to the respective columns C1,
C2, . . . , Cn. The DAC circuit blocks 542-1, 542-2, 542-$n$
generate analog voltages $V_1, V_2, \ldots, V_n$ using the same or
similar time-encoding techniques as discussed above to
generate pulse-modulated voltage pulses (with a same
amplitude but tunable pulse width) which correspond to the
values of the respective digital error signals $\delta_1, \delta_2, \ldots, \delta_n$.

Moreover, for the update operation, the 1×n row vector of
the matrix A applied to the rows for the vector-matrix
application are again input to but scaled with the learning
parameter $\eta$. In particular, as shown in FIG. 5B, digital
signals $\eta x_1, \eta x_2, \ldots, \eta x_n$ are input to respective DAC
circuit blocks 522-1, 522-2, . . . , 522-$n$. The update process
is performed on the RPU array 505 by performing a vector-
vector outer product operation which involves multiplying
the input vector $\eta x=[\eta x_1, \eta x_2, \ldots, \eta x_n]$ with the error
vector $\delta=[\delta_1, \delta_2, \ldots, \delta_n]$ to update conductance values of
the values of the RPU cells 510 and, thereby, incrementally
update matrix values of the approximate inverse matrix P
stored in the RPU array 505. Various methods can be used
to generate the analog voltage pulses (e.g., stochastic pules)
and implement the vector-vector multiplication in the analog
domain, the details of which are not necessary for one of
ordinary skill in the art to understand the exemplary embodi-
ments for computing inverse matrices, as discussed herein.

Figure 6:
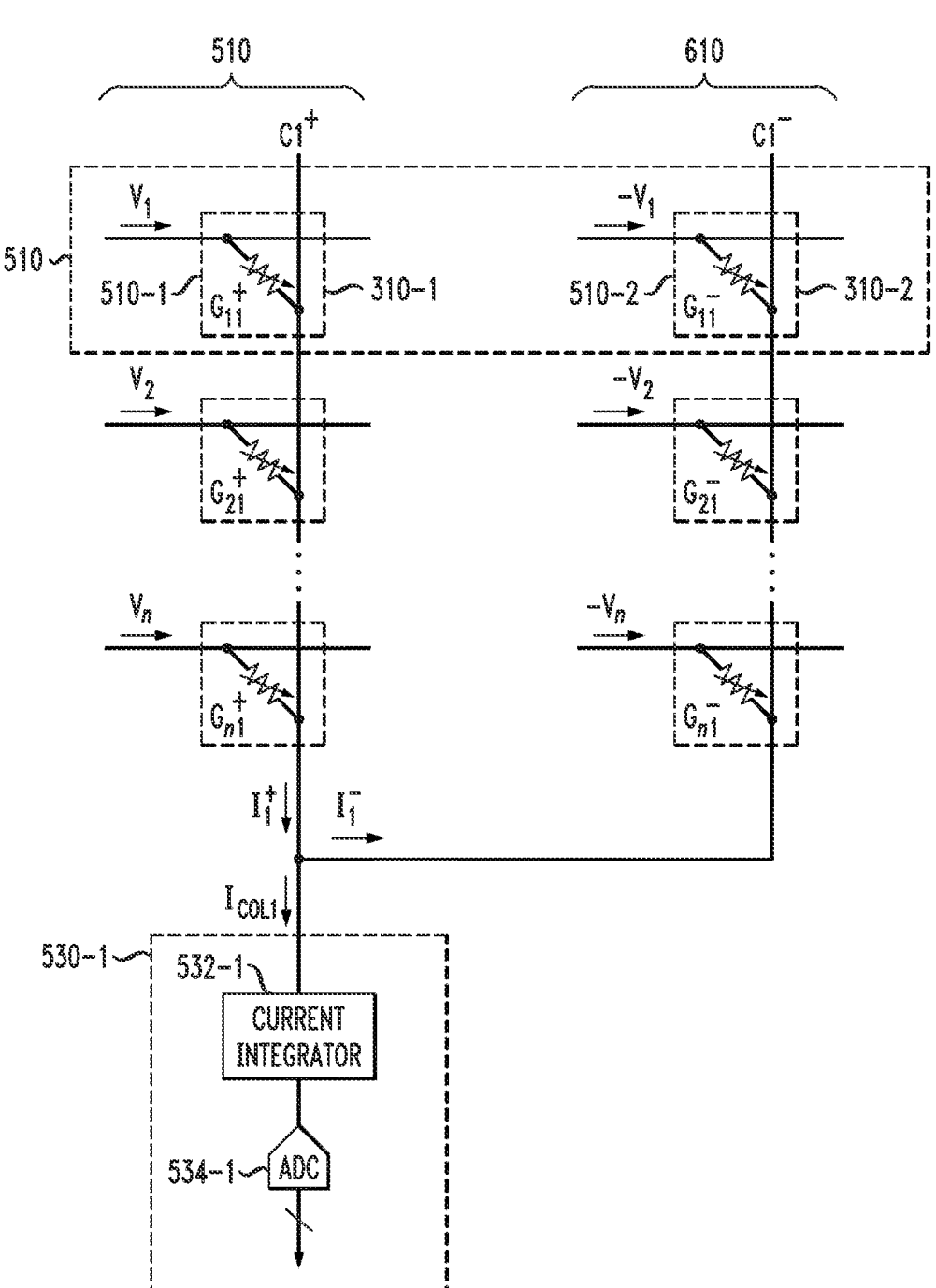
FIG. 6 schematically illustrates a method for configuring a computing system comprising an array of resistive processing unit cells to perform a vector-matrix operation for a matrix inversion process using signed matrix values, according to exemplary embodiments of the disclosure.

While FIG. 5A schematically illustrates an exemplary
method for generating the aggregate column currents for a
vector-matrix multiplication operation performed in the ana-
log domain, other techniques can be implemented to gen-
erate the aggregate column currents using differential cur-
rent techniques that allow for "signed matrix value." For
example, FIG. 6 schematically illustrates a method for
configuring a computing system comprising an array of
resistive processing unit cells to perform a vector-matrix
operation for a matrix inversion process using signed matrix
values, according to exemplary embodiments of the disclo-
sure. In particular, FIG. 6 schematically illustrates a method
for generating an aggregate column current $I_{COL1}$ using
different column currents $I_1^+$ and $I_1^-$ from corresponding
columns C1$^+$ and C1$^-$ of two separate RPU arrays 510 and
610, wherein the conductance is determined as $(G^+-G^-)$.
FIG. 6 schematically illustrates a differential read scheme in
which an aggregate column current $I_{COL1}$ that is input to the
readout circuit block 530-1 is determined as $I_{COL1}=I_1^+-I_1^-$.
With this differential scheme, the magnitude of $I_{COL1}$ will
correspond to a given matrix value, wherein the sign of the
matrix value will depend on the whether $I_1$ is greater than,
equal to, or less than, $I_1^-$. A positive sign ($I_{COL1}>0$) will be obtained when $I_1>I_1^-$. A zero value ($I_{COL1}=0$) will be
obtained when $I_1=I_1^-$. A negative sign ($I_{COL1}<0$) will be
obtained when $I_1<I_1^-$.

More specifically, in the exemplary embodiment of FIG.
6, each RPU cell 510 in the computing system 500 of FIG.
5A comprises two unit RPU cells 510-1 and 510-2 which
have respective conductance values $G_{ij}^+$ and $G_{ij}^-$, wherein
the conductance value of a given RPU cell 510 is determined
as the difference between the respective conductance values,
i.e., $G_{ij}=G_{ij}^+-G_{ij}^-$ where i and j are indices within the RPU
array 505. In this way, negative and positive weights can be
readily encoded using positive-only conductance values. In
other words, since the conductance values of the resistive
devices of the RPU cells can only be positive, the differential
scheme in FIG. 6 implements a pair of identical RPU device
arrays to encode positive ($G_{ij}^+$) and negative ($G_{ij}^-$) matrix
values, wherein the matrix value ($G_{ij}$) of a given RPU cell
is proportional to a difference of two conductance values
stored in two corresponding devices ($G_{ij}^+-G_{ij}^-$) located in
identical positions of the pair of RPU arrays 510 and 610
(wherein the two RPU arrays 510 and 610 can be stacked on
top of each other in a back-end-of-line metallization struc-
ture of a chip). In this instance, a single RPU tile is deemed
a pair of RPU arrays with the peripheral circuits that support
the parallel operation of the array in all three cycles.

A shown in FIG. 6, positive voltage pulses ($V_1$,
$V_2, \ldots, V_n$) and corresponding negative voltage pulses
($-V_1, -V_2, \ldots, -V_n$) are supplied separately to the RPU
cells 510-1 and 510-2 in corresponding rows in the identical
RPU arrays 510 and 610 that are used to encode positive and
negative inverse matrix values. The aggregate column cur-
rents $I_1^+$ and $I_1^-$ that are output from the corresponding first
columns C1$^+$ and C1$^-$ in the respective RPU arrays 510 and
610 are combined to generate a differential aggregate current
$I_{COL1}$ which is input to the readout circuit block 530-1
connected to the corresponding first columns C1$^+$ and C1$^-$.

In some embodiments where complex matrices are imple-
mented (e.g., a complex matrix which comprises a real part
and an imaginary part), the RPU framework of FIG. 6 can
be implemented to store real and imaginary matrix values in
two distinct RPU arrays. For example, in the exemplary
embodiment of FIG. 6, the first RPU array 510 can be
configured to store the real matrix values of a complex
matrix, while the second RPU array is configured to store the
imaginary matrix values of the complect matrix. In this
manner, the respective parts can then be processed sepa-
rately, making it possible to obtain a conjugate transpose A*
and a pseudoinverse A$^\dagger$.

Exemplary embodiments of the present invention may be
a system, a method, and/or a computer program product at
any possible technical detail level of integration. The com-
puter program product may include a computer readable
storage medium (or media) having computer readable pro-
gram instructions thereon for causing a processor to carry
out aspects of the present invention.

The computer readable storage medium can be a tangible
device that can retain and store instructions for use by an
instruction execution device. The computer readable storage
medium may be, for example, but is not limited to, an
electronic storage device, a magnetic storage device, an
optical storage device, an electromagnetic storage device, a
semiconductor storage device, or any suitable combination
of the foregoing. A non-exhaustive list of more specific
examples of the computer readable storage medium includes
the following: a portable computer diskette, a hard disk, a
random access memory (RAM), a read-only memory
(ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
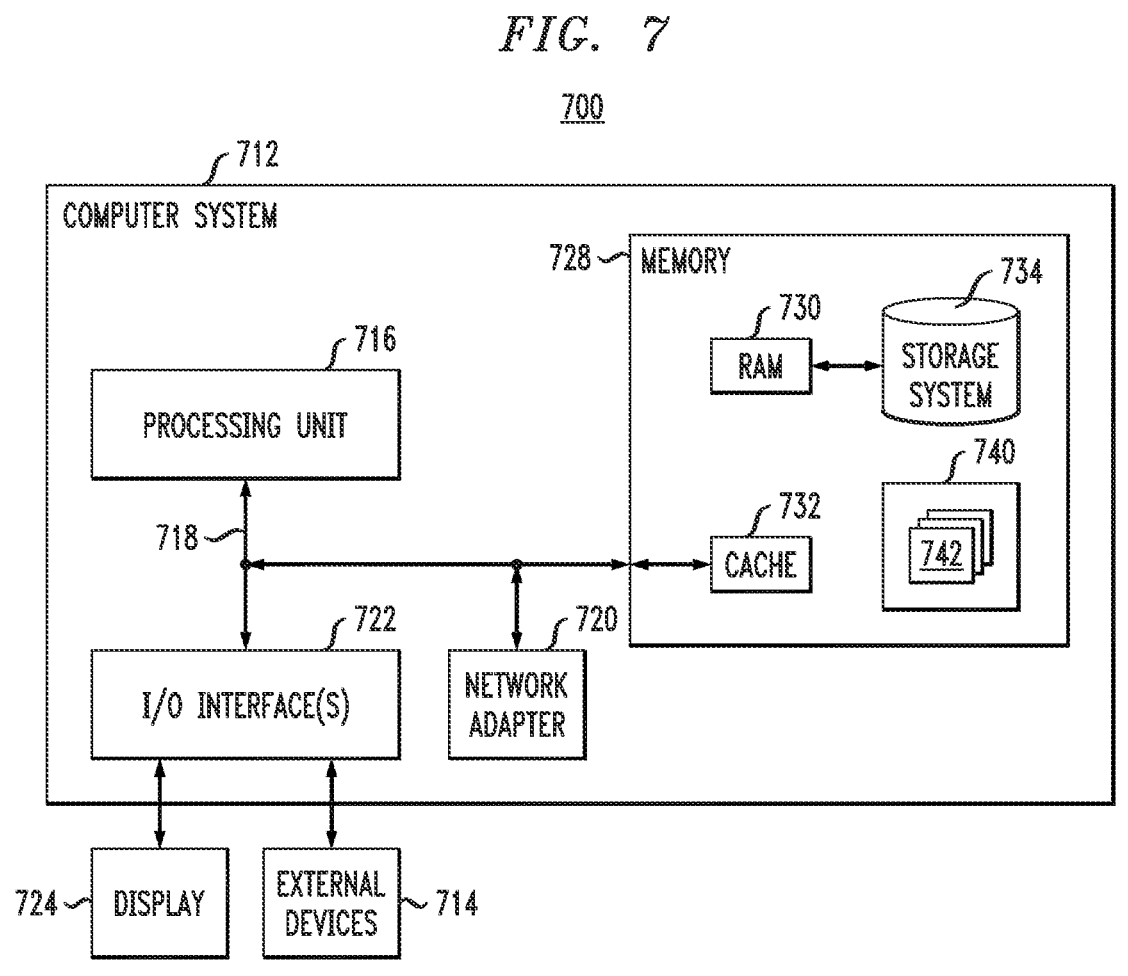

These concepts are illustrated with reference to FIG. 7, which schematically illustrates an exemplary architecture of a computing node which can host and execute a matrix inversion process according to an exemplary embodiment of the disclosure. FIG. 7 illustrates a computing node 700 which comprises a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

In FIG. 7, computer system/server 712 in computing node 700 is shown in the form of a general-purpose computing device. The components of computer system/server 712 may include, but are not limited to, one or more processors or processing units 716, a system memory 728, and a bus 718 that couples various system components including system memory 728 to the processors 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 712 typically includes a variety of computer system readable media. Such media may be any available media that is accessible by computer system/server 712, and it includes both volatile and non-volatile media, removable and non-removable media.

The system memory 728 can include computer system readable media in the form of volatile memory, such as random access memory (RAM) 730 and/or cache memory 732. The computer system/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As depicted and described herein, memory 728 may include at least one program product having a set (e.g., at least one) of program modules that are configured to carry out the functions of embodiments of the invention.

The program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the disclosure as described herein.

Computer system/server 712 may also communicate with one or more external devices 714 such as a keyboard, a pointing device, a display 724, etc., one or more devices that enable a user to interact with computer system/server 712, and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, SSD drives, and data archival storage systems, etc.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
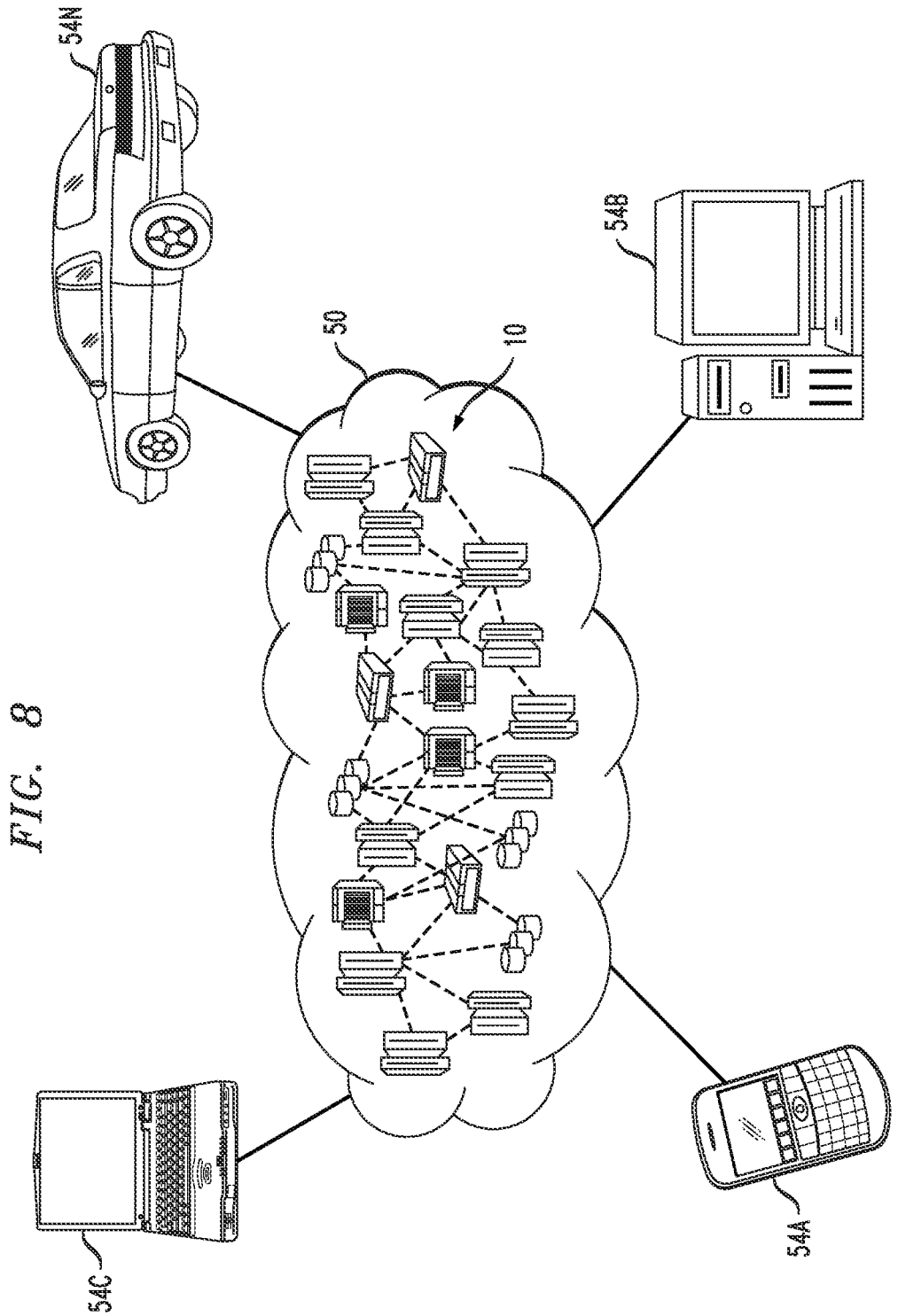
FIG. 8 depicts a cloud computing environment according to an exemplary embodiment of the disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
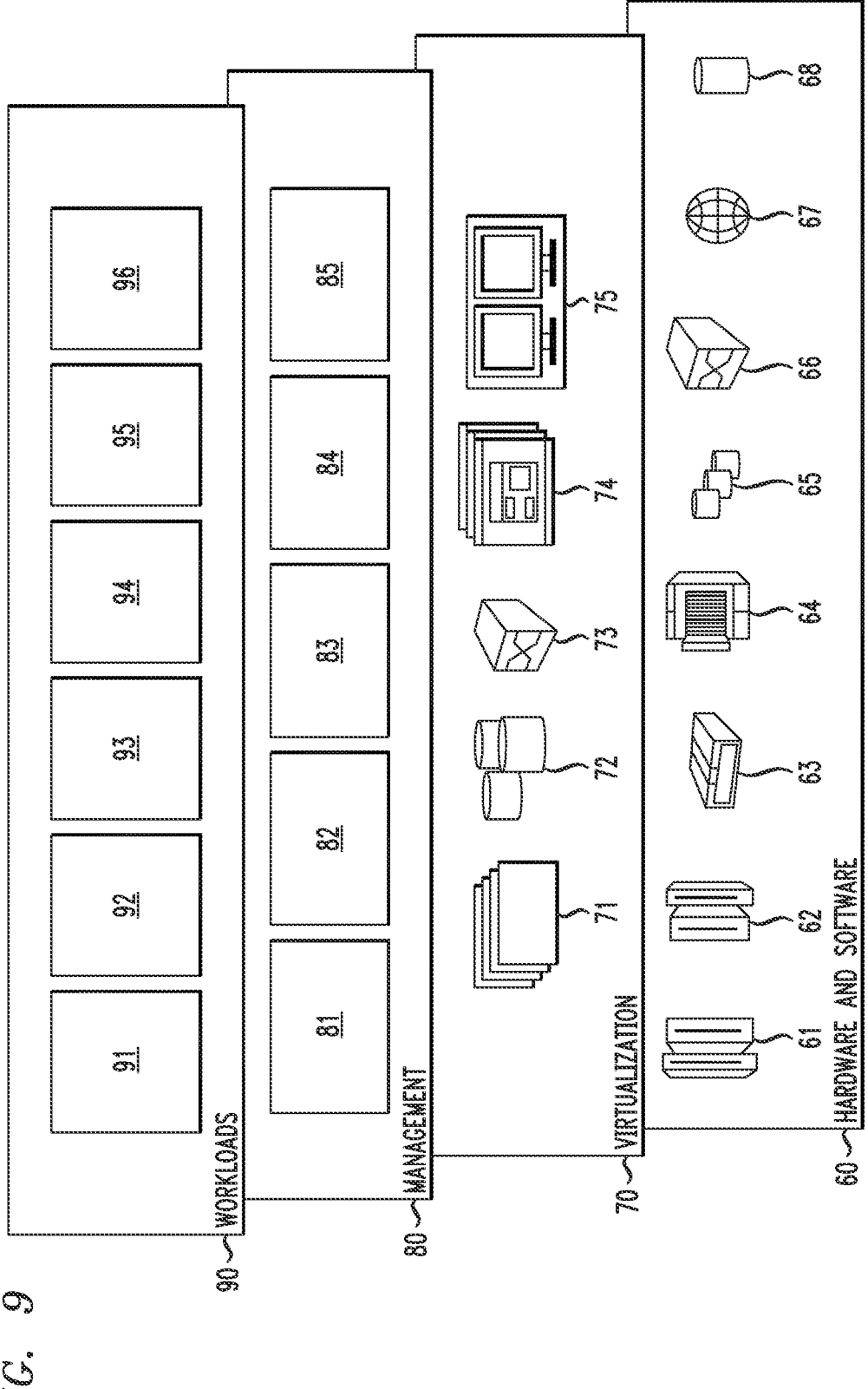
FIG. 9 depicts abstraction model layers according to an exemplary embodiment of the disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and various functions 96 for performing a matrix inversion process using an analog resistive processing unit array for hardware accelerated computing based on the exemplary methods and functions discussed above in conjunction with, e.g., FIG. 3. Furthermore, in some embodiments, the hardware and software layer 60 would include the computing system 100 of FIG. 1 to implement or otherwise support the various workloads and functions 96 for performing a matrix inversion process using an analog resistive processing unit array for hardware accelerated computing.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving, by a digital processing system, a request from an application to compute an inverse matrix of a given matrix;

utilizing, by the digital processing system, an analog resistive processing unit (RPU) system to perform a matrix inversion process in response to the received request, the analog RPU system comprising a crossbar array of RPU cells, each RPU cell comprising a respective resistive memory device with a conductance that is programmable, wherein utilizing the analog RPU system to perform the matrix inversion process comprises:

storing an estimated inverse matrix of the given matrix in the crossbar array of RPU cells of the analog RPU system by programming the conductances of the resistive memory devices of at least portion of the RPU cells to store matrix values of the estimated matrix in the crossbar array of RPU cells;

performing a first iterative process on the estimated inverse matrix stored in the crossbar array of RPU cells to converge the estimated inverse matrix to an approximate inverse matrix of the given matrix, wherein the first iterative process comprises the digital processing system iteratively inputting row vectors to the crossbar array of RPU cells, which represent rows of the given matrix, to perform analog matrix-vector multiplication operations using the analog RPU system to multiply the input row vectors with the estimated inverse matrix stored in the crossbar array of RPU cells, wherein for each iteration, the digital processing system utilizes an output vector resulting from the analog matrix-vector multiplication operation to determine an error vector, and apply the error vector to the crossbar array of RPU cells to change the conductances of at least some of the resistive memory devices of the crossbar array of cells RPU to update at least a portion of the matrix values of the estimated inverse matrix stored in the crossbar array of RPU cells; and reading the approximate inverse matrix from the crossbar array of RPU cells upon completion of the first iterative process; and returning, by the digital processing system, an inverse matrix to the application, wherein the returned inverse matrix is based, at least in part, on the approximate inverse matrix.

2. The method of claim 1, wherein the first iterative process comprises a stochastic gradient descent optimization process which comprises utilizing the row vectors of the given matrix as training data to train the estimated inverse matrix stored in the crossbar array of RPU cells and update matrix values of the estimated inverse matrix stored in the crossbar array of RPU cells by utilizing the error vectors that are determined based on matrix values of an identity matrix.

3. The method of claim 1, wherein performing the first iterative process comprises performing an iteration of the first iterative process, wherein performing the iteration comprises:

performing a vector matrix operation on the crossbar array of RPU cells, wherein performing the vector matrix operation comprises inputting a given row vector, which represents a given row of the given matrix, to the crossbar array of RPU cells, and multiplying the given row vector with the estimated inverse matrix stored in the crossbar array of RPU cells to generate an output vector which is output from the crossbar array of RPU cells; and performing an update operation to update matrix values of the estimated inverse matrix stored in the crossbar array of RPU cells, wherein performing the update operation comprises determining an error vector based on a difference between the output vector and a row vector of an identity matrix, inputting both the row vector of the given matrix and the determined error vector to the crossbar array of RPU cells, and performing an outer product operation of the row vector and the determined error vector on the crossbar array of RPU cells to update at least some matrix values of the estimated inverse matrix that is stored in the crossbar array of RPU cells.

4. The method of claim 3, wherein performing the update operation further comprises:

scaling values of the row vector according to a learning rate parameter to generate a scaled row vector; and performing the outer product operation of the scaled row vector and the determined error vector on the crossbar array of RPU cells to update at least some matrix values of the estimated inverse matrix that is stored in the crossbar array of RPU cells.

5. The method of claim 3, further comprising repeating the iteration of the first iterative process for each row vector of the given matrix to complete an epoch of the first iterative process.

6. The method of claim 3, further comprising performing the first iterative process for a prespecified number of epochs, wherein the first iterative process is deemed complete following completion of the prespecified number of epochs.

7. The method of claim 1, wherein the given matrix comprises a symmetric positive definite matrix.

8. The method of claim 1, wherein storing the estimated inverse matrix of the given matrix in the crossbar array of RPU cells comprises:

computing a random matrix; and storing the random matrix in the crossbar array of RPU cells as an initial estimate of the inverse matrix of the given matrix.

9. The method of claim 1, further comprising performing a second iterative process on the approximate inverse matrix read out from the crossbar array of RPU cells to thereby generate a final approximate inverse matrix that has an accuracy which is greater than an accuracy of the approximate inverse matrix, wherein the second iterative process comprises an optimization process that is performed in a digital domain, and wherein the final approximate inverse matrix comprises the inverse matrix which is returned to the application.

10. The method of claim 9, wherein the second iterative process comprise a Newton optimization process.

11. A computer program product for performing a matrix inversion process, the computer program product comprising:

one or more non-transitory computer readable storage media, and program instructions collectively stored on the one or more non-transitory computer readable storage media, the program instructions comprising:

program instructions to receive a request from an application to compute an inverse matrix of a given matrix;

program instructions to utilize an analog resistive processing unit (RPU) system to perform a matrix inversion process in response to the received request, the analog RPU system comprising a crossbar array of RPU cells, each RPU cell comprising a respective resistive memory device with a conductance that is programmable, wherein the program instructions to utilize the analog RPU system to perform the matrix inversion process comprise:

program instructions to store an estimated inverse matrix of the given matrix in the crossbar array of RPU cells of the analog RPU system by programming the conductances of the resistive memory devices of at least portion of the RPU cells to store matrix values of the estimated matrix in the crossbar array of RPU cells;

program instructions to perform a first iterative process on the estimated inverse matrix stored in the crossbar array of RPU cells to converge the estimated inverse matrix to an approximate inverse matrix of the given matrix, wherein the first iterative process comprises iteratively inputting row vectors to the crossbar array of RPU cells, which represent rows of the given matrix, to perform analog matrix-vector multiplication operations using the analog RPU system to multiply the input row vectors with the estimated inverse matrix stored in the crossbar array of RPU cells, wherein for each iteration, an output vector resulting from the analog matrix-vector multiplication operation is utilized to determine an error vector which is applied to the crossbar array of RPU cells to change the conductances of at least some of the resistive memory devices of the crossbar array of cells RPU to update at least a portion of the matrix values of the estimated inverse matrix stored in the crossbar array of RPU cells; and program instruction to read the approximate inverse matrix from the crossbar array of RPU cells upon completion of the first iterative process; and program instructions to return an inverse matrix to the application, wherein the returned inverse matrix is based, at least in part, on the approximate inverse matrix.

12. The computer program product of claim 11, wherein the first iterative process comprises a stochastic gradient descent optimization process which comprises utilizing the row vectors of the given matrix as training data to train the estimated inverse matrix stored in the crossbar array of RPU cells and update matrix values of the estimated inverse matrix stored in the crossbar array of RPU cells by utilizing the error vectors that are determined based on matrix values of an identity matrix.

13. The computer program product of claim 11, wherein the program instructions to perform the first iterative process comprise program instructions to perform an iteration of the first iterative process, wherein the program instructions to perform the iteration comprise:

program instructions to perform a vector matrix operation on the crossbar array of RPU cells, wherein performing the vector matrix operation comprises inputting a given row vector, which represents a given row of the given matrix, to the crossbar array of RPU cells, and multiplying the given row vector with the estimated inverse matrix stored in the crossbar array of RPU cells to generate an output vector which is output from the crossbar array of RPU cells; and program instructions to perform an update operation to update matrix values of the estimated inverse matrix stored in the crossbar array of RPU cells, wherein performing the update operation comprises determining an error vector based on a difference between the output vector and a row vector of an identity matrix, inputting both the row vector of the given matrix and the determined error vector to the crossbar array of RPU cells, and performing an outer product operation of the row vector and the determined error vector on the crossbar array of RPU cells to update at least some matrix values of the estimated inverse matrix that is stored in the crossbar array of RPU cells.

14. The computer program product of claim 13, wherein the program instructions to perform the update operation further comprise:

program instructions to scale values of the row vector according to a learning rate parameter to generate a scaled row vector; and program instructions to perform the outer product operation of the scaled row vector and the determined error vector on the crossbar array of RPU cells to update at least some matrix values of the estimated inverse matrix that is stored in the crossbar array of RPU cells.

15. The computer program product of claim 13, further comprising program instructions to repeat the iteration of the first iterative process for each row vector of the given matrix to complete an epoch of the first iterative process, and perform the first iterative process for a prespecified number of epochs, wherein the first iterative process is deemed complete following completion of the prespecified number of epochs.

16. The computer program product of claim 11, further comprising program instructions to perform a second iterative process on the approximate inverse matrix read out from the crossbar array of RPU cells to thereby generate a final approximate inverse matrix that has an accuracy which is greater than an accuracy of the approximate inverse matrix, wherein the second iterative process comprises an optimization process that is performed in a digital domain, and wherein the final approximate inverse matrix comprises the inverse matrix which is returned to the application.

17. The computer program product of claim 16, wherein the second iterative process comprise a Newton optimization process.

18. A method comprising:

storing an estimated inverse matrix of a given matrix in a crossbar array of resistive processing unit (RPU) cells, wherein the RPU cells comprise respective resistive memory devices with conductances that are programmed to encode an array of matrix values of the estimated inverse matrix that is stored in the array of RPU cells;

performing a first operation on the crossbar array of RPU cells, wherein the first operation comprises:

applying a row vector, which represents a row of the given matrix, to inputs of first control lines that extend in a first direction across the crossbar array of RPU cells; and performing a vector matrix multiplication operation on the crossbar array of RPU cells to generate an output vector on outputs of second control lines that extend in a second direction across the crossbar array of RPU cells, wherein the output vector represents a multiplication of the row vector and the array of matrix values of the estimated inverse matrix that is stored in the crossbar array of RPU cells; and performing a second operation on the array of RPU cells, wherein the second operation comprises:

applying a scaled row vector to the inputs of the first control lines, wherein the scaled row vector comprises the row vector scaled by a learning rate parameter;

applying an error vector to inputs of the second control lines; and performing an outer product operation on the crossbar array of RPU cells to change the conductances of at least some of the resistive memory devices of the crossbar array of cells RPU to update at least some of the matrix values of the estimated inverse matrix that is stored in the crossbar array of RPU cells, wherein the outer product operation comprises performing an outer product of the scaled row vector and the error vector.

19. The method of claim 18, wherein the error vector represents a difference between the output vector generated by the first operation and a corresponding row vector of an identity matrix associated with the given matrix.

20. The method of claim 18, wherein the first and second operations are performed as part of an iterative stochastic gradient descent process which comprises utilizing the matrix values in row vectors of the given matrix as training data to train the estimated inverse matrix stored in the crossbar array of RPU cells and, thereby, converge the estimated inverse matrix to an increasingly accurate estimation of an actual inverse matrix of the given matrix.

21. A device, comprising:

an array of resistive processing unit (RPU) cells, first control lines extending in a first direction across the array of RPU cells, and second control lines extending in a second direction across the array of RPU cells, wherein each RPU cell is connected at an intersection of one of the first control lines and one of the second control lines, wherein each RPU cell comprises a resistive device with a tunable conductance, wherein conductance values of a least a portion of the resistive devices of the RPU cells in the array of RPU cells encode matrix values of an estimated inverse matrix that is stored in the array of RPU cells, wherein the estimated inverse matrix stored in the array of RPU cells represents an estimate of an inverse matrix of a given matrix; and control circuitry operatively coupled to the array of RPU cells to cause performance of a first operation and a second operation on the array of RPU cells;

wherein the first operation comprises the control circuitry applying a row vector, which represents a row of the given matrix, to inputs of the first control lines to perform a vector matrix operation which comprises multiplying the input row vector with the estimated inverse matrix stored in the array of RPU cells to generate an output vector on outputs of the second control lines; and wherein the second operation comprises the control circuitry applying an error vector to inputs of the second control lines and inputting the row vector to the inputs of the first control lines, to perform an outer product operation of the error vector and the row vector on the array of RPU calls to thereby update at least some matrix values of the estimated inverse matrix that is stored in the array of RPU cells.

22. The device of claim 21, wherein the error vector represents a difference between the output vector and a corresponding row vector of an identity matrix corresponding to the given matrix.

23. A computing system, comprising:

a digital processing system comprising one or more processors and memory to store program instructions that are executed by the one or more processors to perform a matrix inversion process to compute an inverse matrix of a given matrix; and a neuromorphic computing system, coupled to the digital processing system, the neuromorphic computing system comprising at least one neural core, wherein the at least one neural core comprises an array of resistive processing unit (RPU) cells, first control lines extending in a first direction across the array of RPU cells, second control lines extending in a second direction across the array of RPU cells, and peripheral circuitry coupled to the first control lines and to the second control lines, wherein each RPU cell is connected at an intersection of one of the first control lines and one of the second control lines, wherein each RPU cell comprises a resistive device with a tunable conductance, wherein conductance values of a least a portion of the resistive devices of the RPU cells in the array of RPU cells encode matrix values of an estimated inverse matrix that is stored in the array of RPU cells, wherein the estimated inverse matrix stored in the array of RPU cells represents an estimate of the inverse matrix of the given matrix;

wherein the digital processing system controls the peripheral circuitry of the at least one neural core to perform first and second operations of the matrix inversion process on the array of RPU cells;

wherein the first operation comprises the digital processing system applying a row vector, which represents a row of the given matrix, to inputs of the first control lines to perform a vector matrix operation which comprises multiplying the row vector with the estimated inverse matrix stored in the array of RPU cells to generate an output vector on outputs of the second control lines; and wherein the second operation comprises the digital processing system applying an error vector to inputs of the second control lines and inputting the row vector to the inputs of the first control lines, to perform an outer product operation of the error vector and the row vector on the array of RPU calls to thereby update at least some matrix values of the estimated inverse matrix that is stored in the array of RPU cells.

24. The computing system of claim 23, wherein the digital processing system performs an iterative process on the estimated inverse matrix stored in the array of RPU cells, wherein the iterative process repeats the first and second operations for each row of the given matrix, and wherein the iterative process comprises a stochastic gradient descent optimization process.

25. The computing system of claim 23, wherein the digital processing system reads out the estimated inverse matrix stored in the array of RPU cells and performs a second iterative process on the estimated inverse matrix read out from the array of RPU cells to increase an accuracy of the estimated inverse matrix of the given matrix, wherein the second iterative process comprise a Newton optimization process.

* * * * *